US007991232B2

(12) United States Patent
Iwamoto

(10) Patent No.: US 7,991,232 B2
(45) Date of Patent: Aug. 2, 2011

(54) IMAGE SIMILARITY CALCULATION SYSTEM, IMAGE SEARCH SYSTEM, IMAGE SIMILARITY CALCULATION METHOD, AND IMAGE SIMILARITY CALCULATION PROGRAM

(75) Inventor: Kota Iwamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1265 days.

(21) Appl. No.: 10/567,561

(22) PCT Filed: Mar. 2, 2005

(86) PCT No.: PCT/JP2005/003468
§ 371 (c)(1),
(2), (4) Date: Feb. 8, 2006

(87) PCT Pub. No.: WO2005/086092
PCT Pub. Date: Sep. 15, 2005

(65) Prior Publication Data
US 2008/0152225 A1   Jun. 26, 2008

(30) Foreign Application Priority Data
Mar. 3, 2004   (JP) .................................. 2004-059736

(51) Int. Cl.
*G06K 9/46* (2006.01)
(52) U.S. Cl. ......... 382/190; 382/118; 382/305; 348/207
(58) Field of Classification Search .................. 382/190, 382/305, 118; 707/6; 725/135; 348/207.99
See application file for complete search history.

(56) References Cited

U.S. PATENT DOCUMENTS

| | | | | |
|---|---|---|---|---|
| 5,293,433 A | * | 3/1994 | Bernsen et al. ............... | 382/275 |
| 5,515,453 A | * | 5/1996 | Hennessey et al. ........... | 382/141 |
| 5,614,945 A | | 3/1997 | Sekine et al. | |

(Continued)

FOREIGN PATENT DOCUMENTS

JP   07-123364   5/1995

(Continued)

OTHER PUBLICATIONS

A. R. Appas et al., "Speeding the Vector Search Algorithm for Regional Color Channel Features Based Indexing and Retrieval Systems," Multiple Approaches to Intelligent Systems Lecture Notes in Computer Science; Lecture notes in artificial intelligence, vol. 1611, 1999, pp. 205-214.

(Continued)

*Primary Examiner* — Wesley Tucker
*Assistant Examiner* — Aklilu K Woldemariam
(74) *Attorney, Agent, or Firm* — Foley & Lardner LLP

(57) ABSTRACT

There is provided an image similarity calculation system which yields a large value for image similarity between an edited image and an original image. A local region weight calculation means 14 calculates a weight value for each local region in the image as a local region weight value, based on probability of editing each local region in the image. The local region weight calculation means 14 outputs the calculated local region weight value to an image similarity calculation means 122. A small region similarity calculation means 121 compares a feature quantity for each small region resulting from dividing an inquiry image with a feature quantity for each small region resulting from dividing a reference image. The small region similarity calculation means 121 calculates a similarity of feature quantities for the respective small regions. The image similarity calculation means 122 calculates an image similarity between the inquiry image and the reference image by applying a small-region-based weight value to the calculated similarity. This weight value is found from a local region weight value supplied from the local region weight calculation means 14.

14 Claims, 20 Drawing Sheets

U.S. PATENT DOCUMENTS

| | | | |
|---|---|---|---|
| 5,734,441 A * | 3/1998 | Kondo et al. | 348/700 |
| 6,049,354 A | 4/2000 | Sekine et al. | |
| 6,163,622 A * | 12/2000 | Abdel-Mottaleb et al. | 382/170 |
| 6,345,111 B1 * | 2/2002 | Yamaguchi et al. | 382/118 |
| 6,519,360 B1 * | 2/2003 | Tanaka | 382/162 |
| 6,529,630 B1 | 3/2003 | Kinjo | |
| 6,564,206 B1 * | 5/2003 | Ikeda | 707/3 |
| 6,801,663 B2 | 10/2004 | Matsushita et al. | |
| 6,823,335 B2 * | 11/2004 | Ikeda | 707/6 |
| 6,999,636 B1 * | 2/2006 | Enokida et al. | 382/305 |
| 7,215,827 B2 | 5/2007 | Ito et al. | |
| 2001/0003182 A1 | 6/2001 | Labelle | |
| 2002/0087538 A1 * | 7/2002 | Abdel-Mottaleb et al. | 707/6 |
| 2003/0110515 A1 | 6/2003 | Satoda | |
| 2003/0156754 A1 | 8/2003 | Ouchi | |
| 2003/0161504 A1 | 8/2003 | Inoue | |
| 2004/0228505 A1 * | 11/2004 | Sugimoto | 382/118 |
| 2006/0020597 A1 * | 1/2006 | Keating et al. | 707/6 |
| 2006/0083443 A1 * | 4/2006 | Tojo | 382/305 |
| 2007/0047843 A1 * | 3/2007 | Kazama | 382/305 |
| 2007/0122009 A1 * | 5/2007 | Jee et al. | 382/118 |
| 2008/0152225 A1 * | 6/2008 | Iwamoto | 382/190 |
| 2008/0263036 A1 * | 10/2008 | Yamamoto | 707/6 |

FOREIGN PATENT DOCUMENTS

| | | |
|---|---|---|
| JP | 08-098133 | 4/1996 |
| JP | 09-251513 | 9/1997 |
| JP | 10-112834 | 4/1998 |
| JP | 11-312248 | 11/1999 |
| JP | 11-316845 | 11/1999 |
| JP | 2000-163576 A | 6/2000 |
| JP | 2000-259847 A | 9/2000 |
| JP | 2001-134765 A | 5/2001 |
| JP | 2001-245269 | 9/2001 |
| JP | 2002-044573 A | 2/2002 |
| JP | 2002-074265 A | 3/2002 |
| JP | 2002-304415 A | 10/2002 |
| JP | 2003-179884 A | 6/2003 |
| JP | 2003-179888 A | 6/2003 |
| JP | 2003-216649 A | 7/2003 |
| JP | 2003-323622 A | 11/2003 |
| JP | 2003-333424 A | 11/2003 |
| JP | 2004-005484 A | 1/2004 |

OTHER PUBLICATIONS

X. Li, Image retrieval based on perceptive weighted color blocks, Pattern Recognition Letters, North-Holland Publ. Amsterdam, NL. vol. 24:12, Aug. 2003, XP004422289, pp. 1935-1941.

J. Peng et al., "Probabilistic Feature Relevance Learning for Content-Based Image Retrieval," Computer Vision and Image Understanding, vol. 75, Nos. 1/2 Jul./Aug. 1999, pp. 150-164.

* cited by examiner

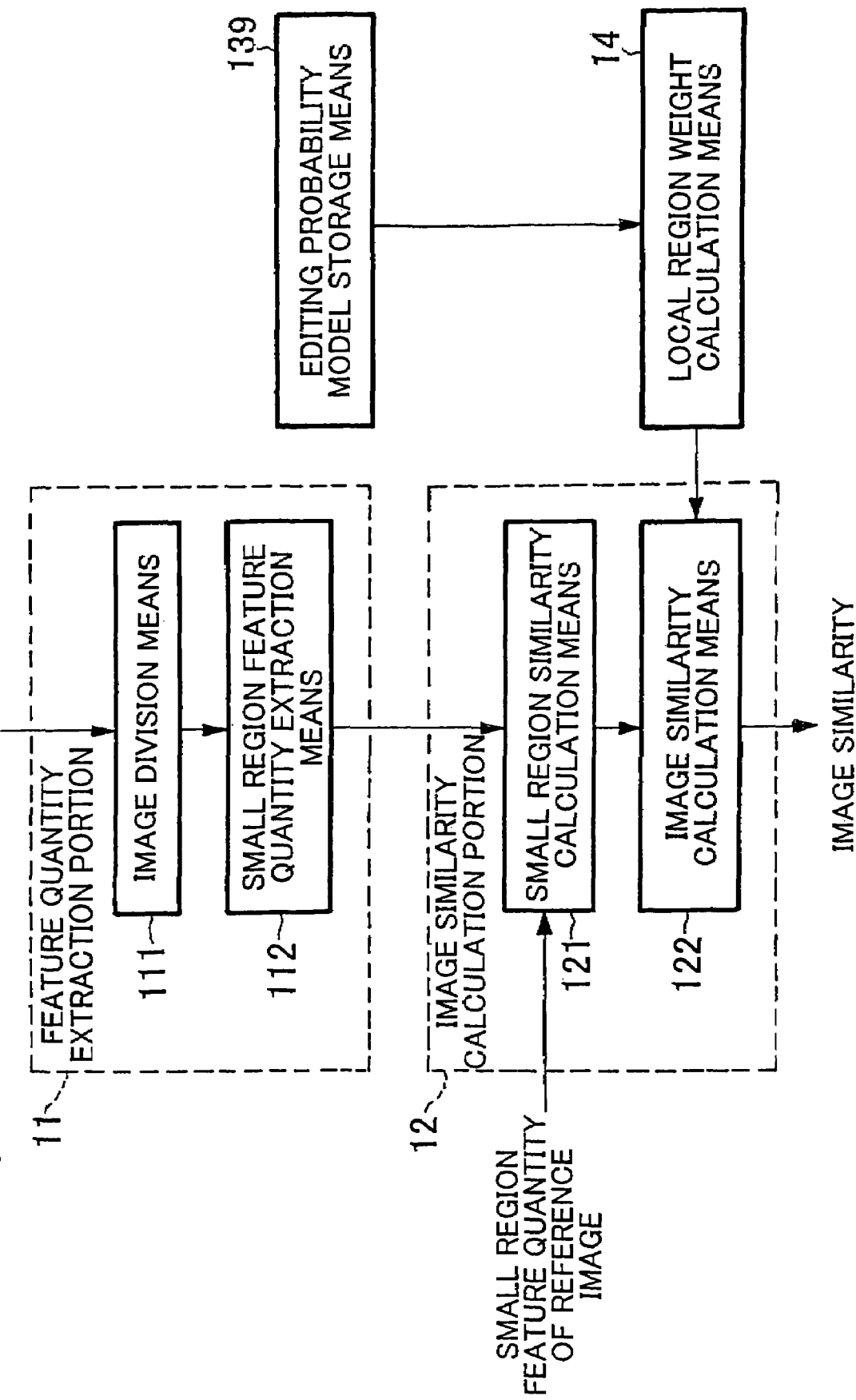

FIG.5A

LOCAL REGION EDITING
PROBABILITY

| 0.8 | 0.1 | 0.1 | 0.7 |
|---|---|---|---|
| 0.7 | 0.01 | 0.01 | 0.5 |
| 0.6 | 0.2 | 0.2 | 0.4 |
| 0.7 | 0.9 | 0.8 | 0.6 |

(NEWS IMAGE)

FIG.5B

LOCAL REGION EDITING
PROBABILITY

| 0.9 | 0.5 | 0.5 | 0.9 |
|---|---|---|---|
| 0.5 | 0.1 | 0.1 | 0.4 |
| 0.4 | 0.3 | 0.3 | 0.3 |
| 0.9 | 0.8 | 0.8 | 0.7 |

(SPORTS IMAGE)

FIG.5C

LOCAL REGION EDITING
PROBABILITY

| 0.7 | 0.3 | 0.3 | 0.7 |
|---|---|---|---|
| 0.4 | 0.4 | 0.4 | 0.3 |
| 0.4 | 0.6 | 0.5 | 0.4 |
| 0.6 | 0.4 | 0.3 | 0.6 |

(VARIETY IMAGE)

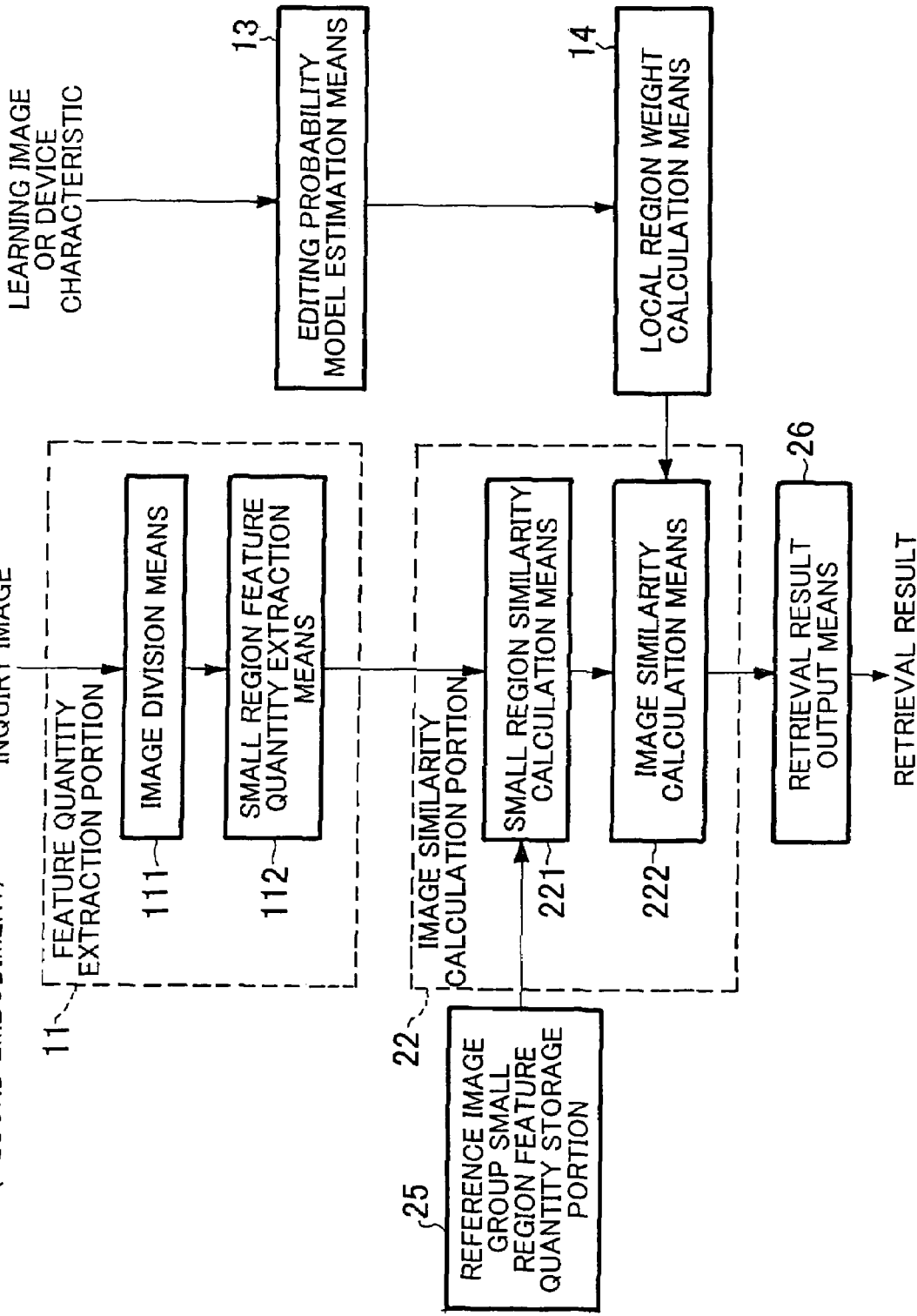

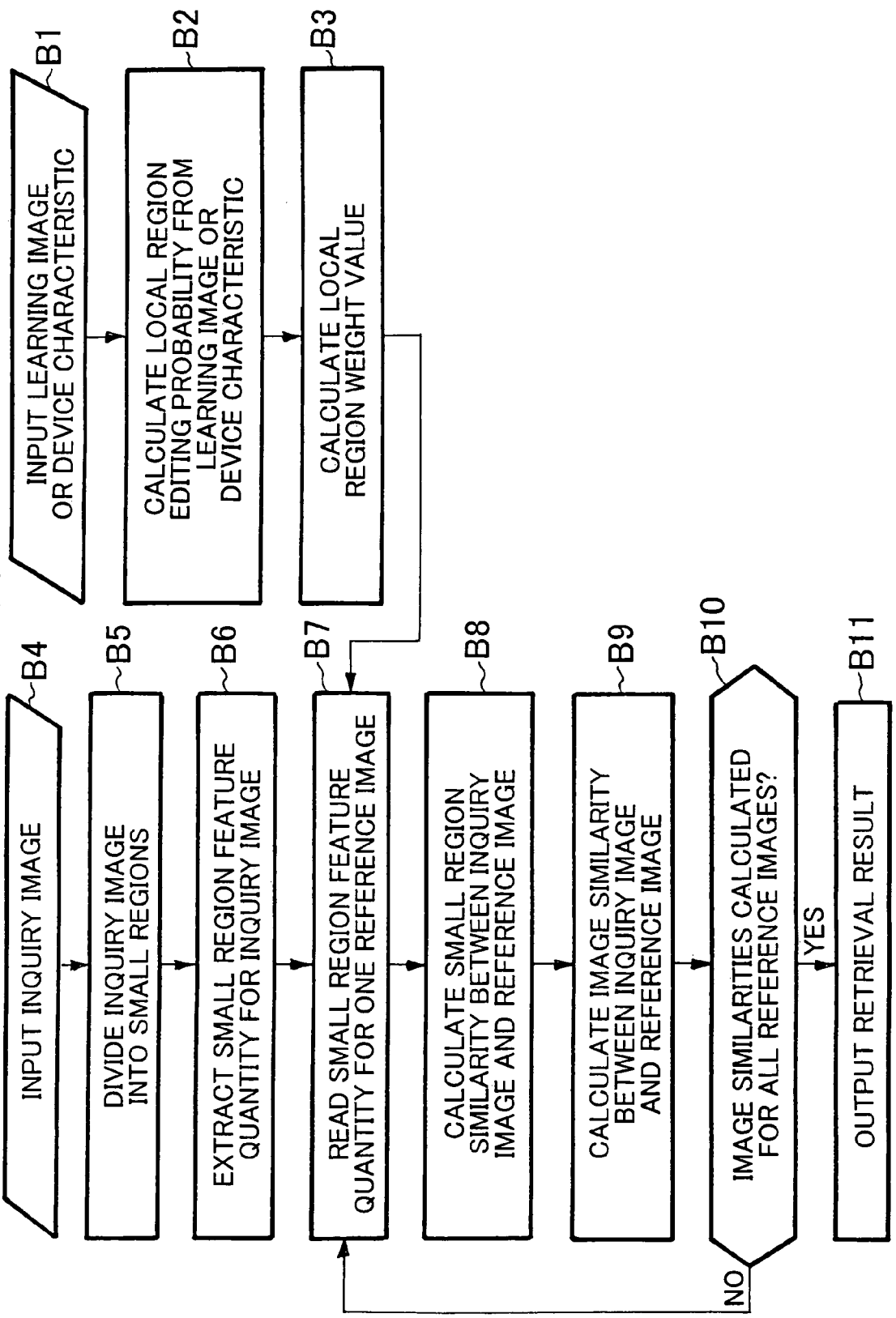

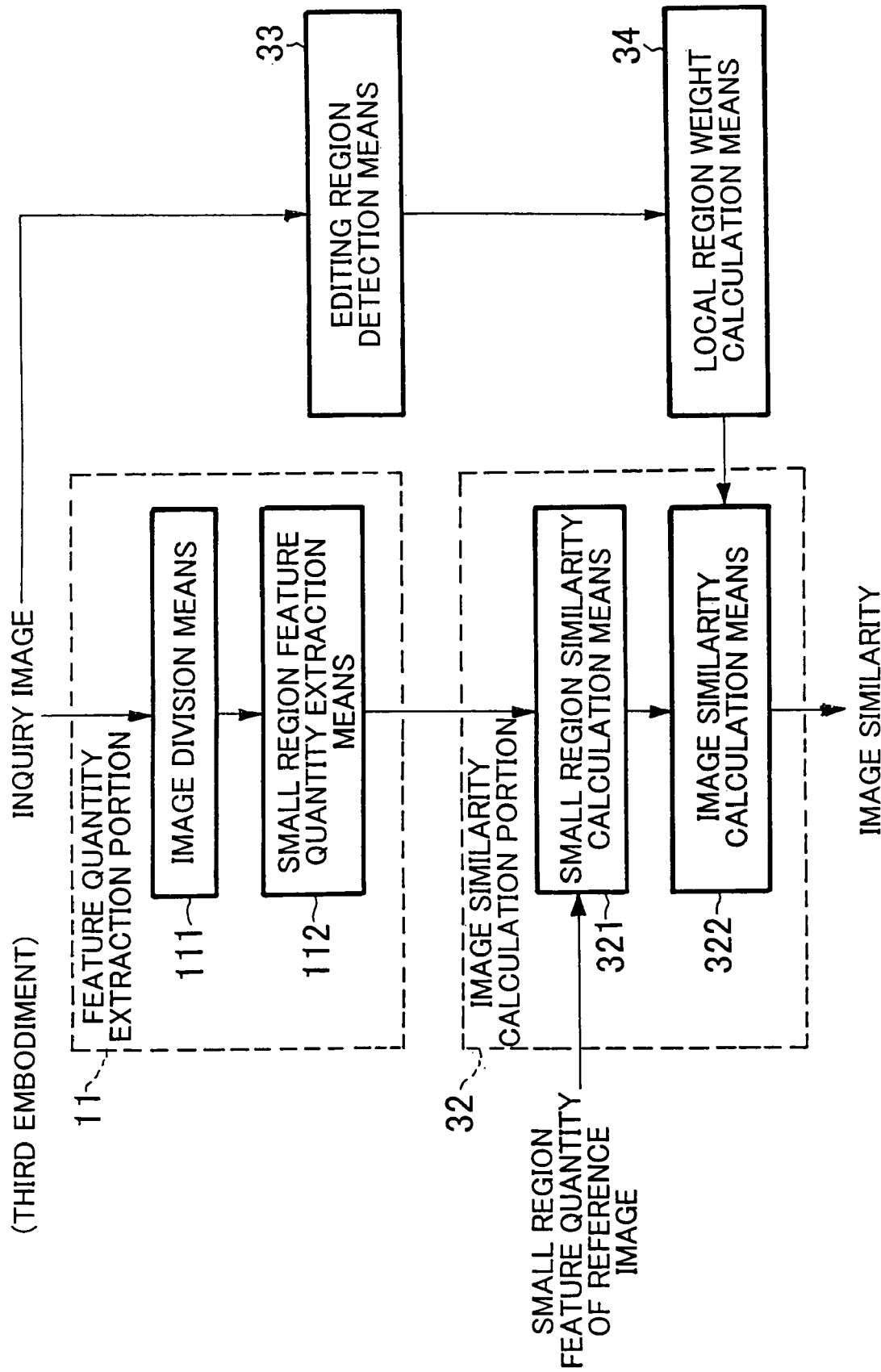

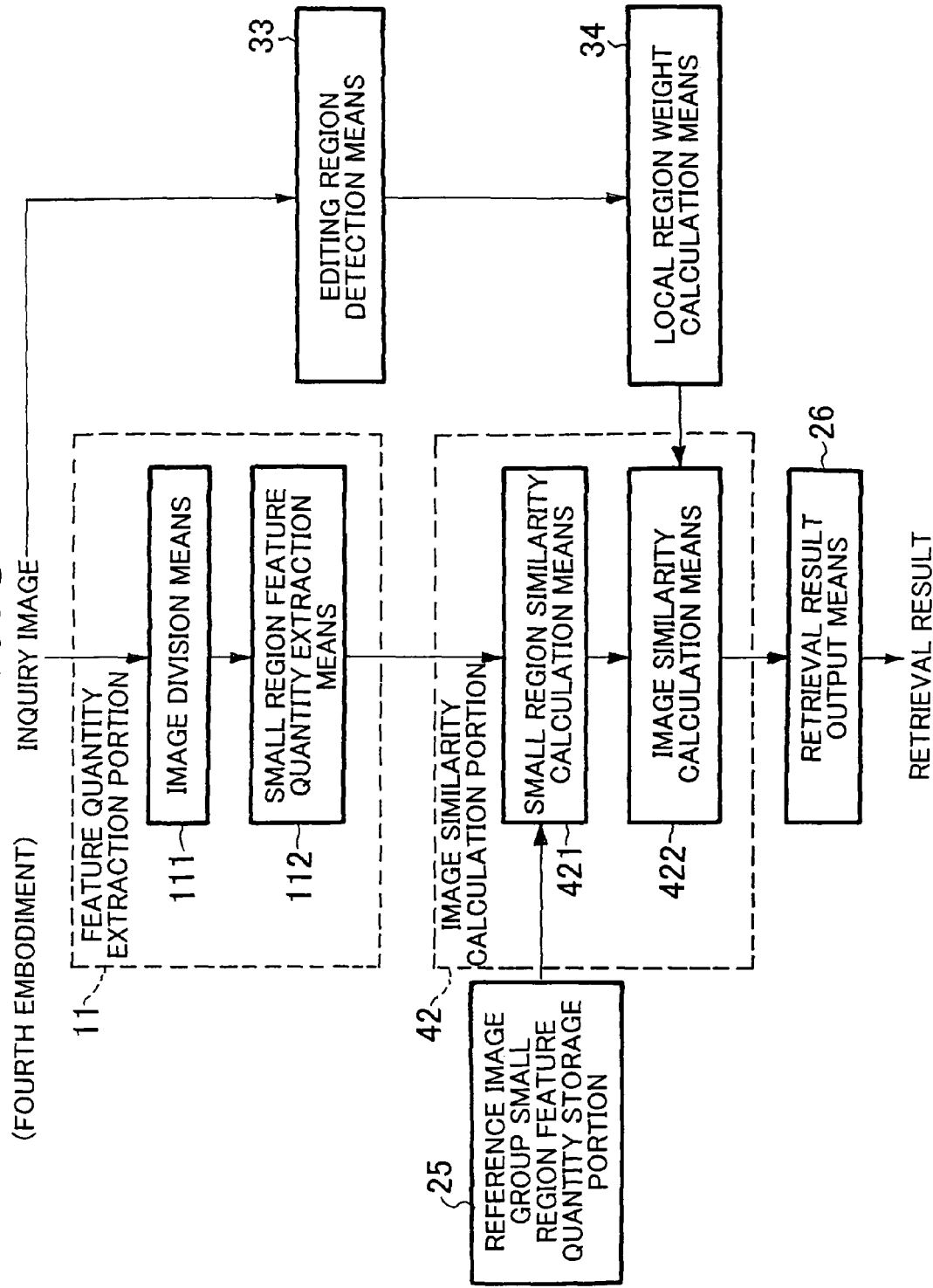

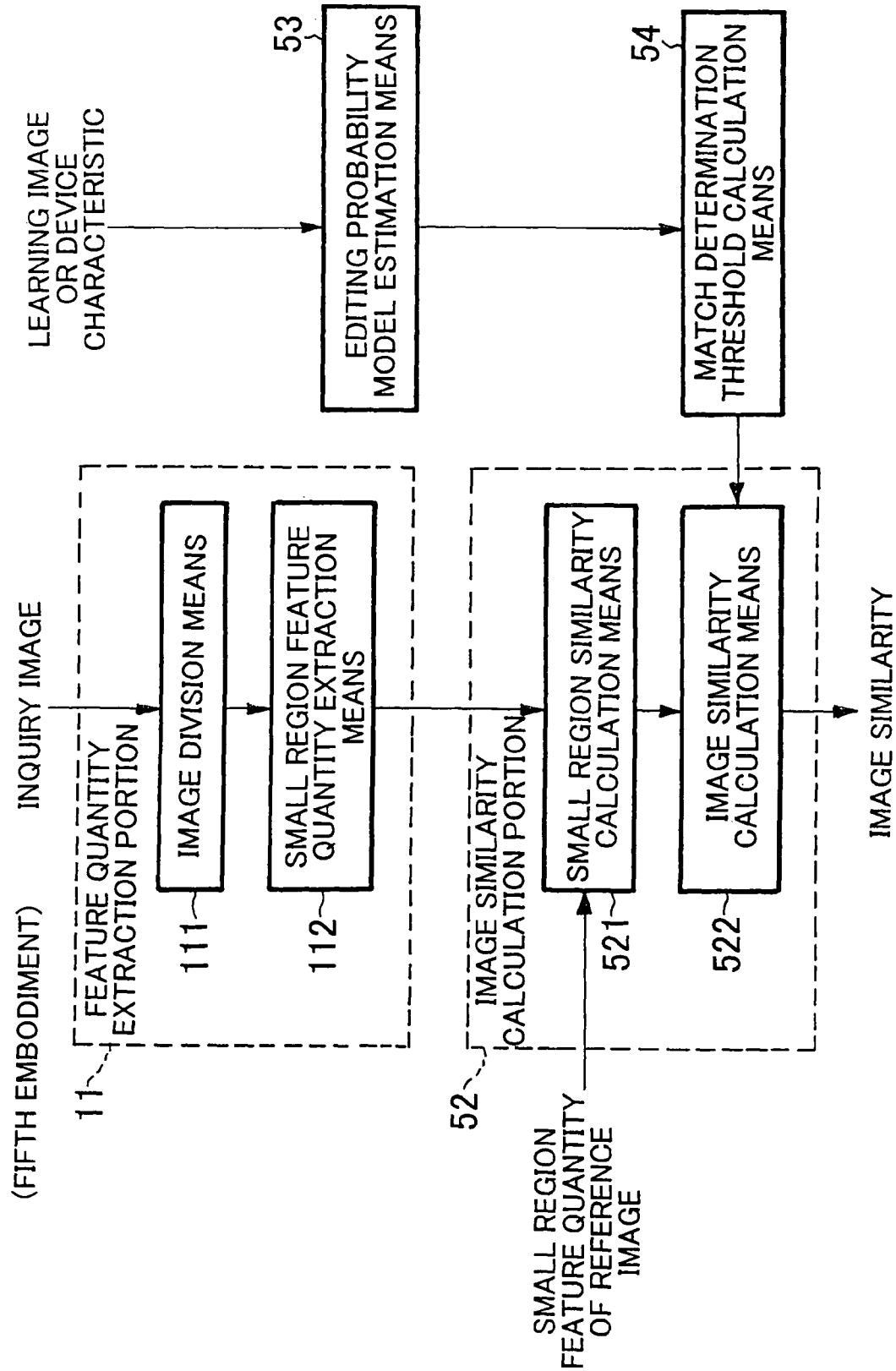

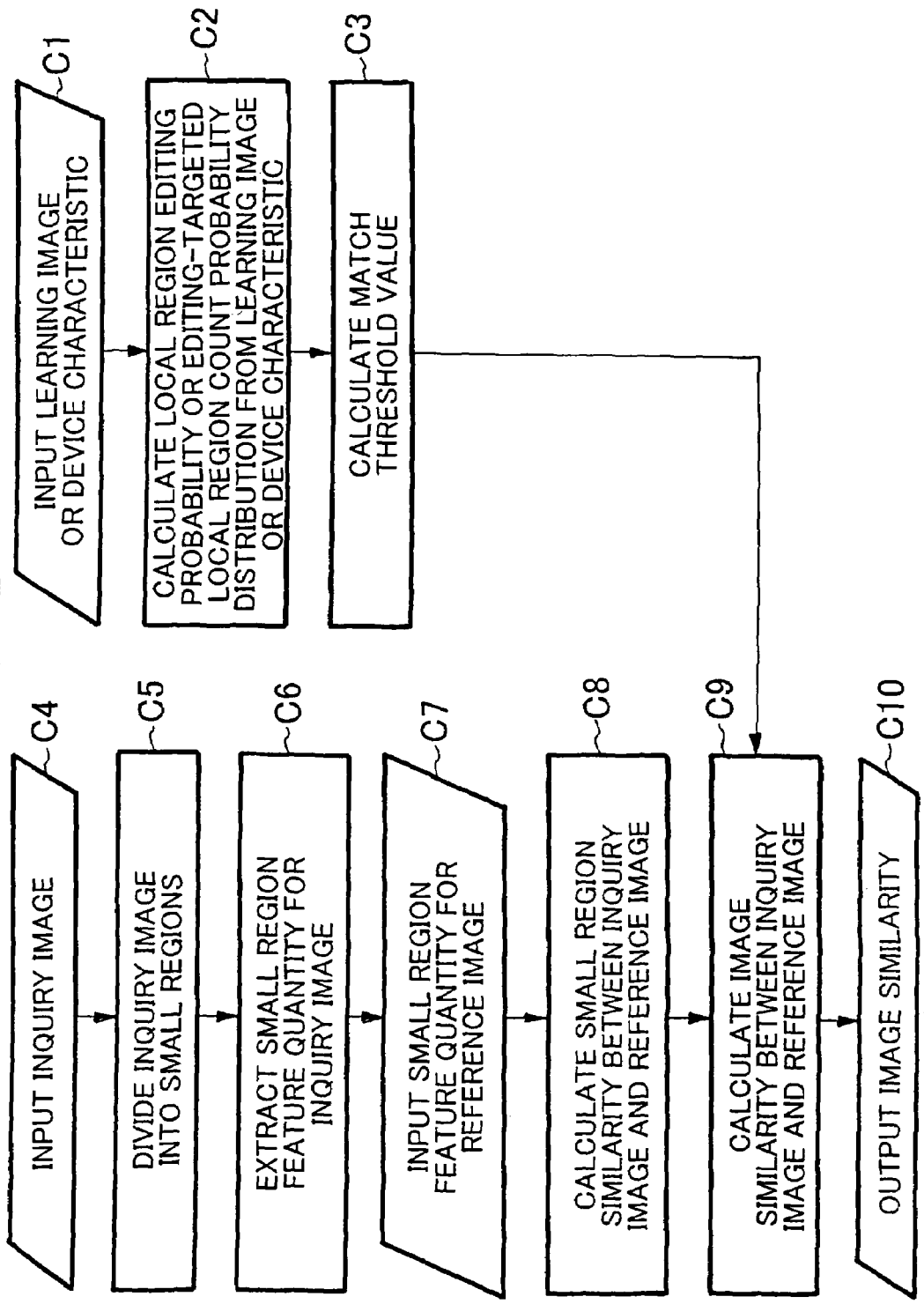

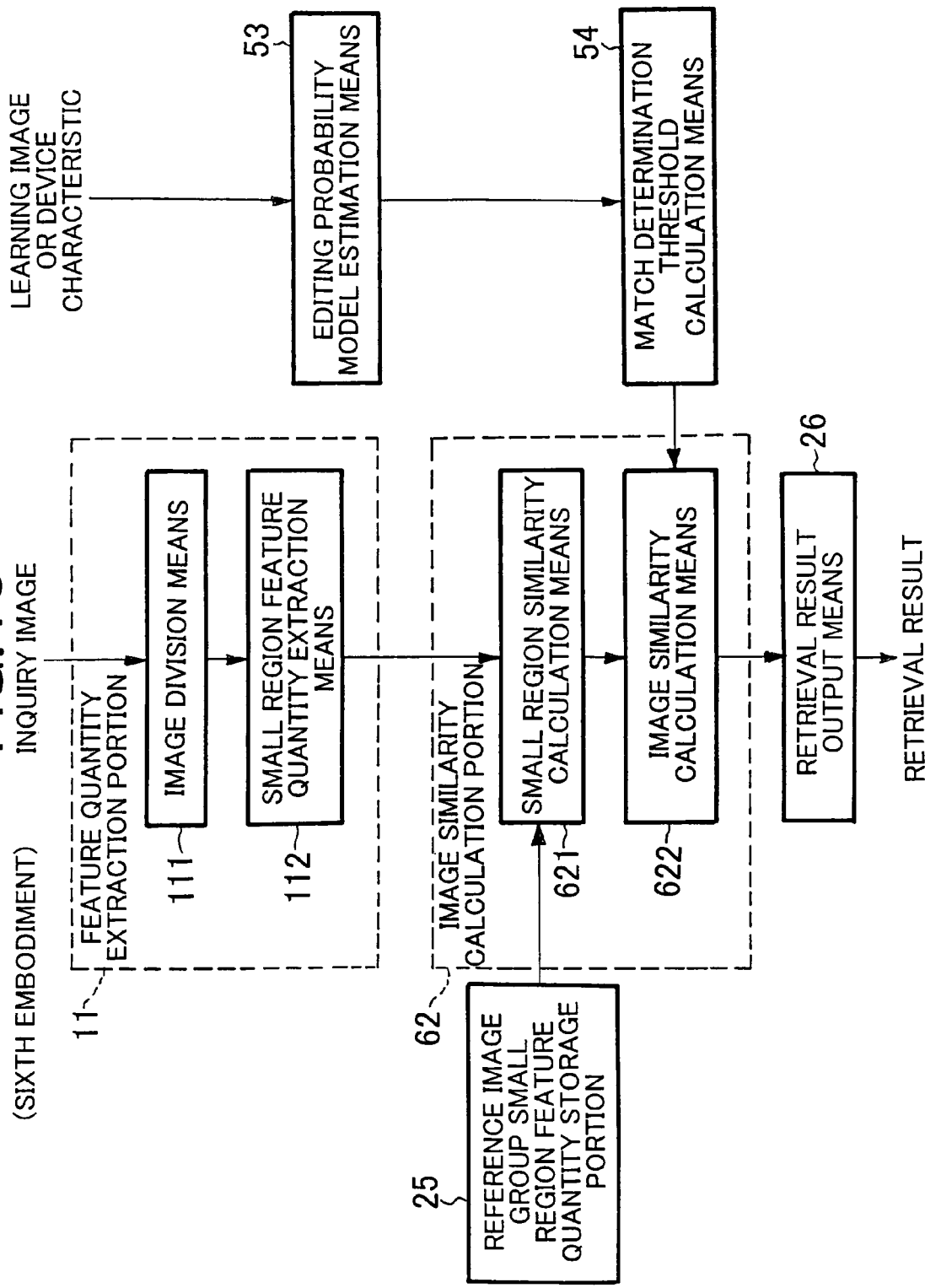

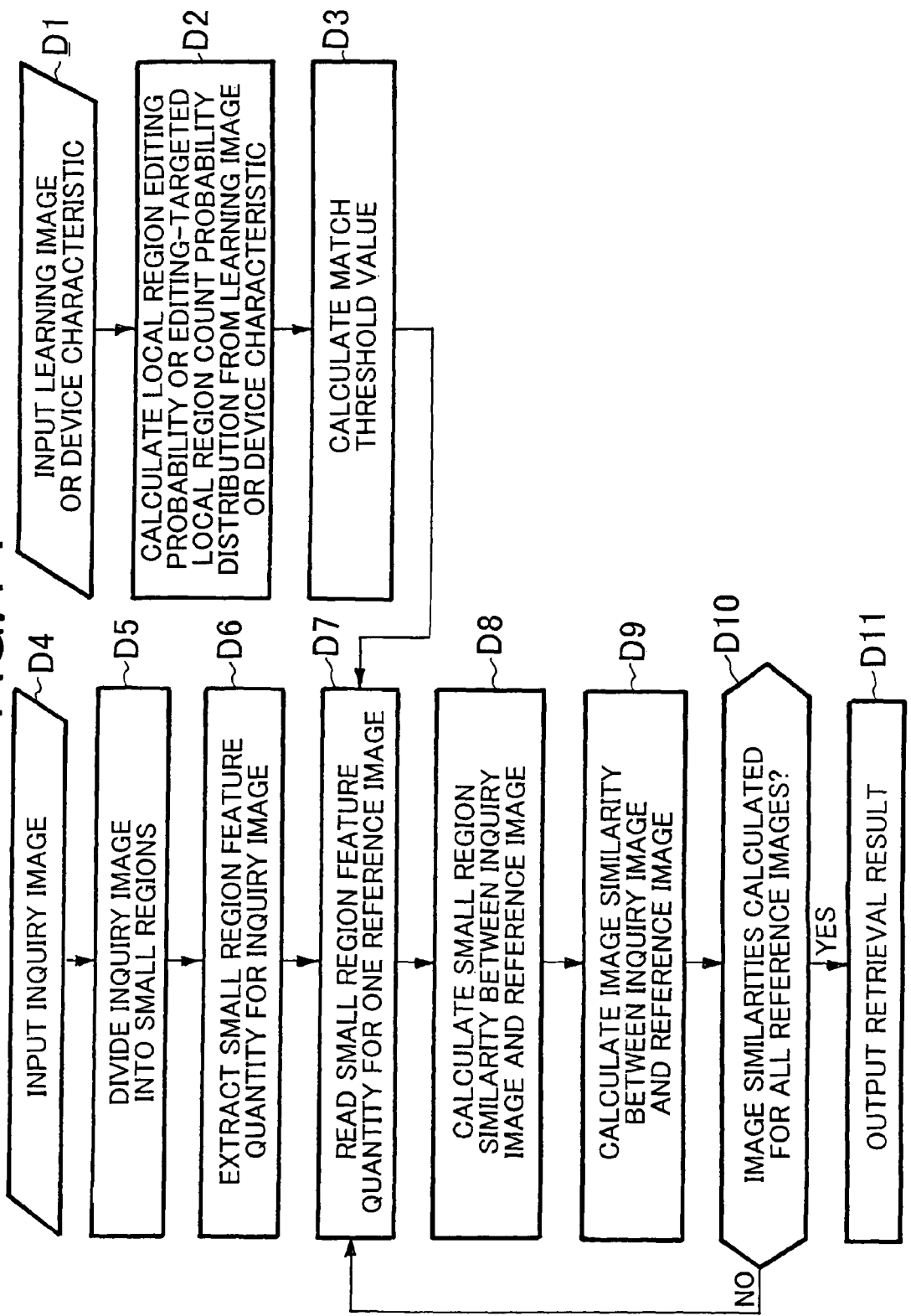

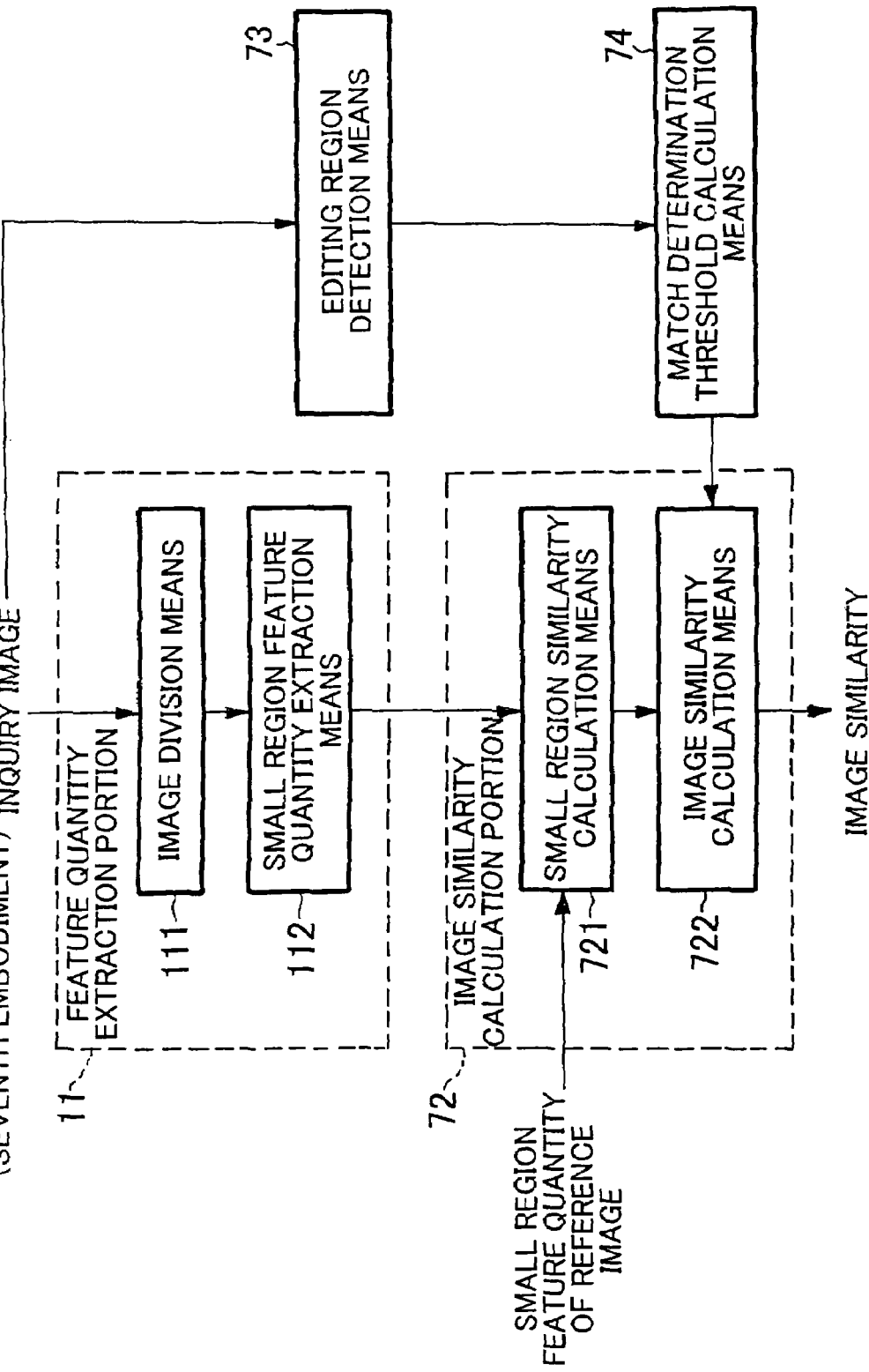

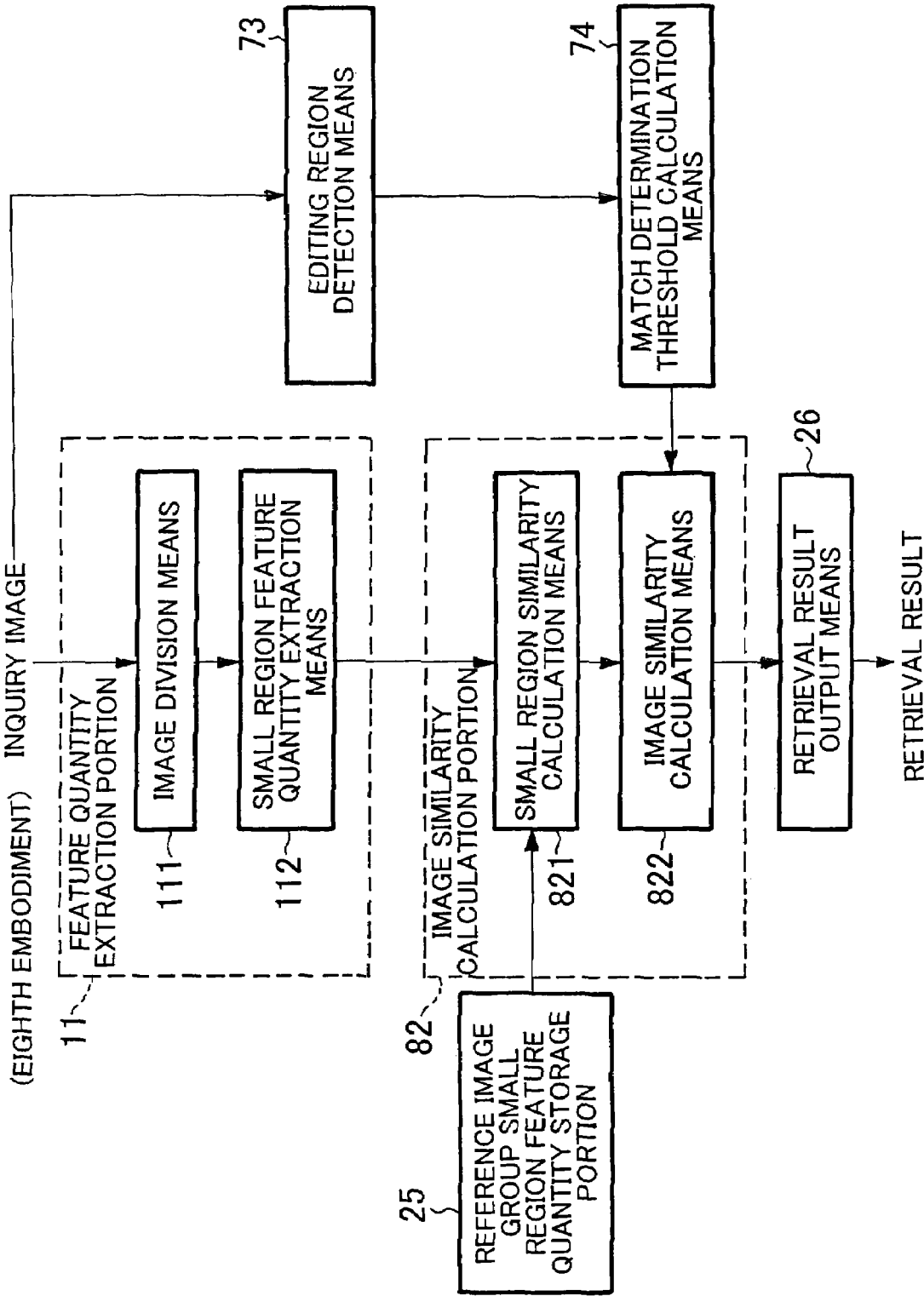

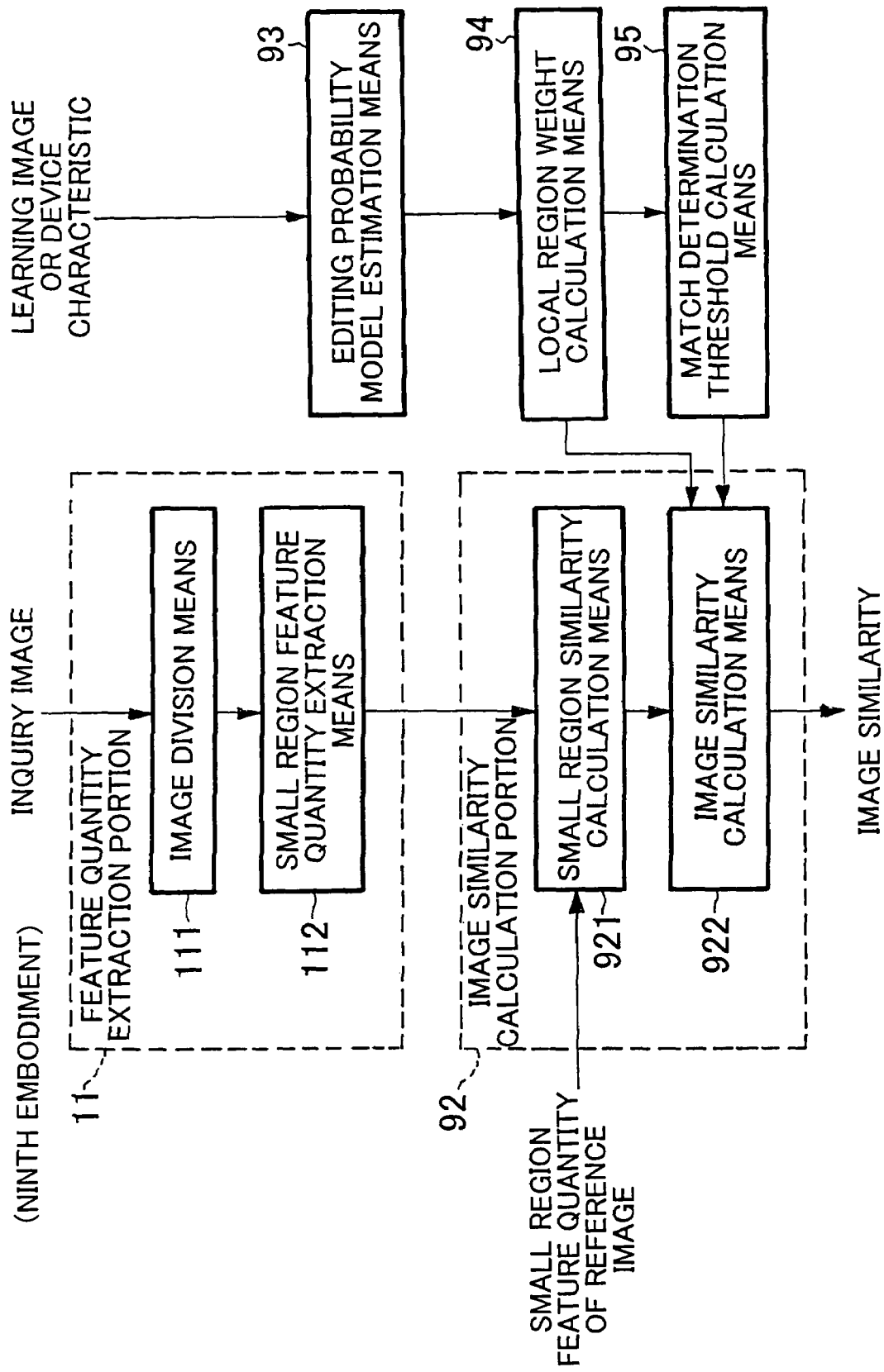

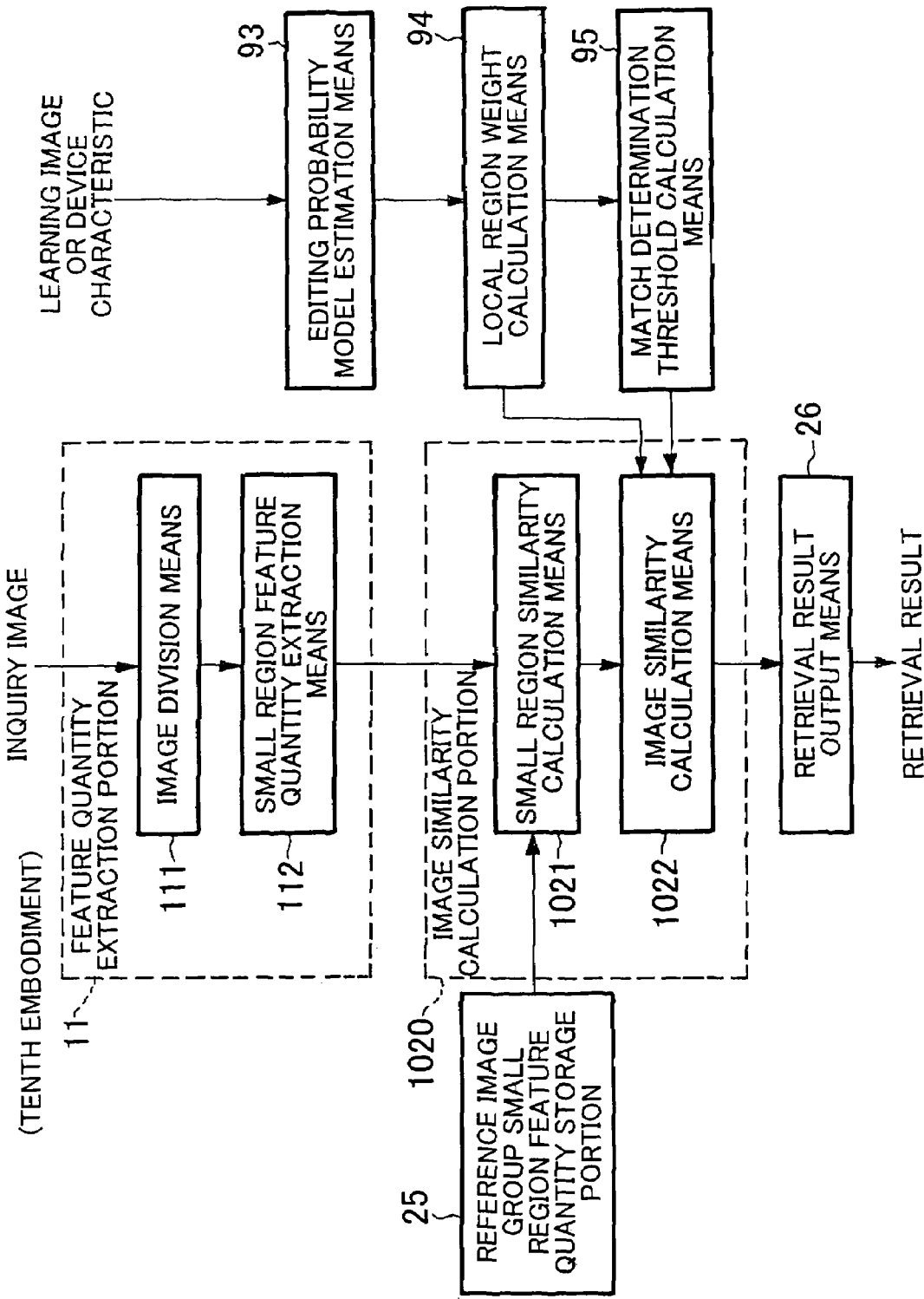

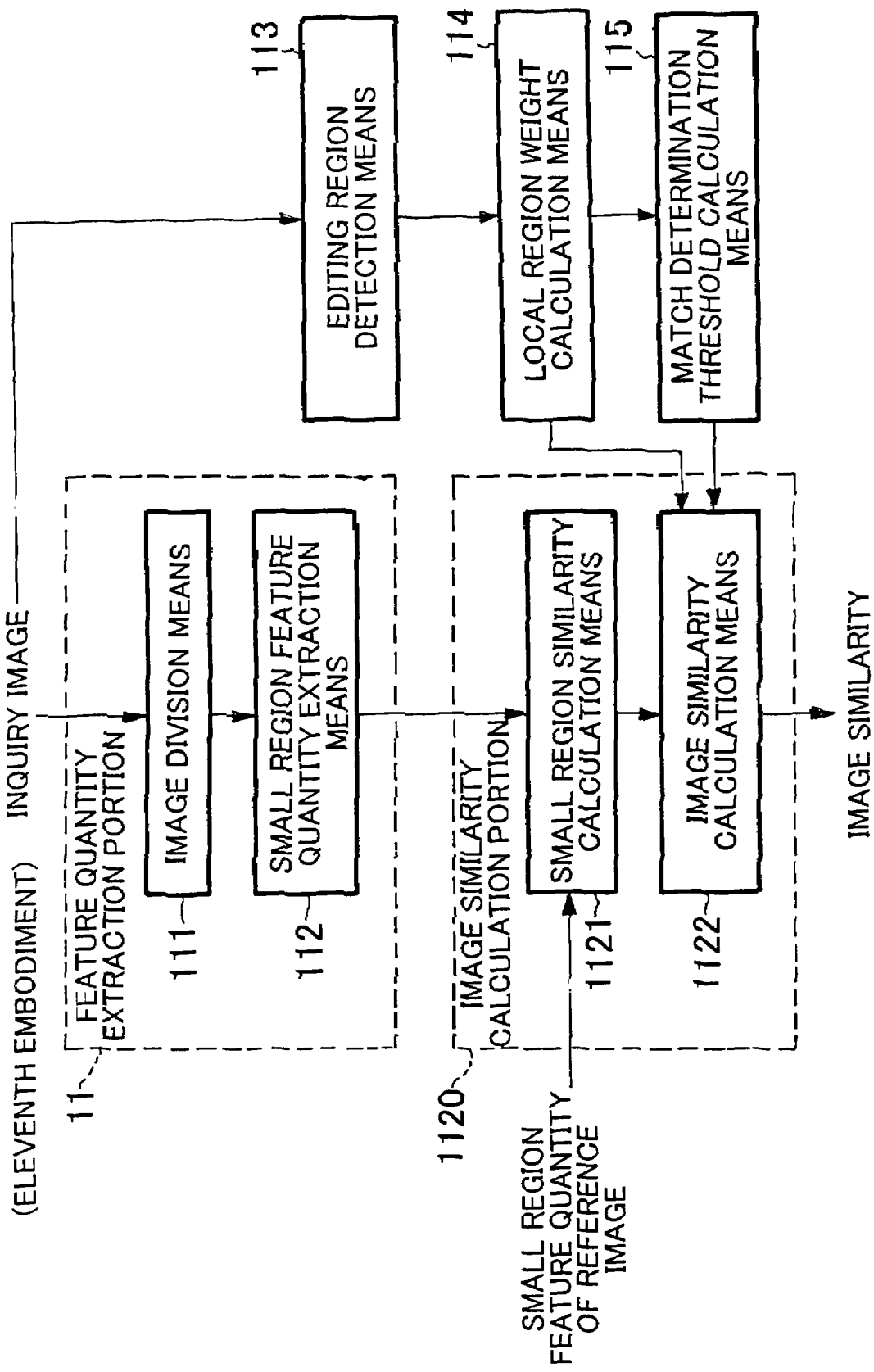

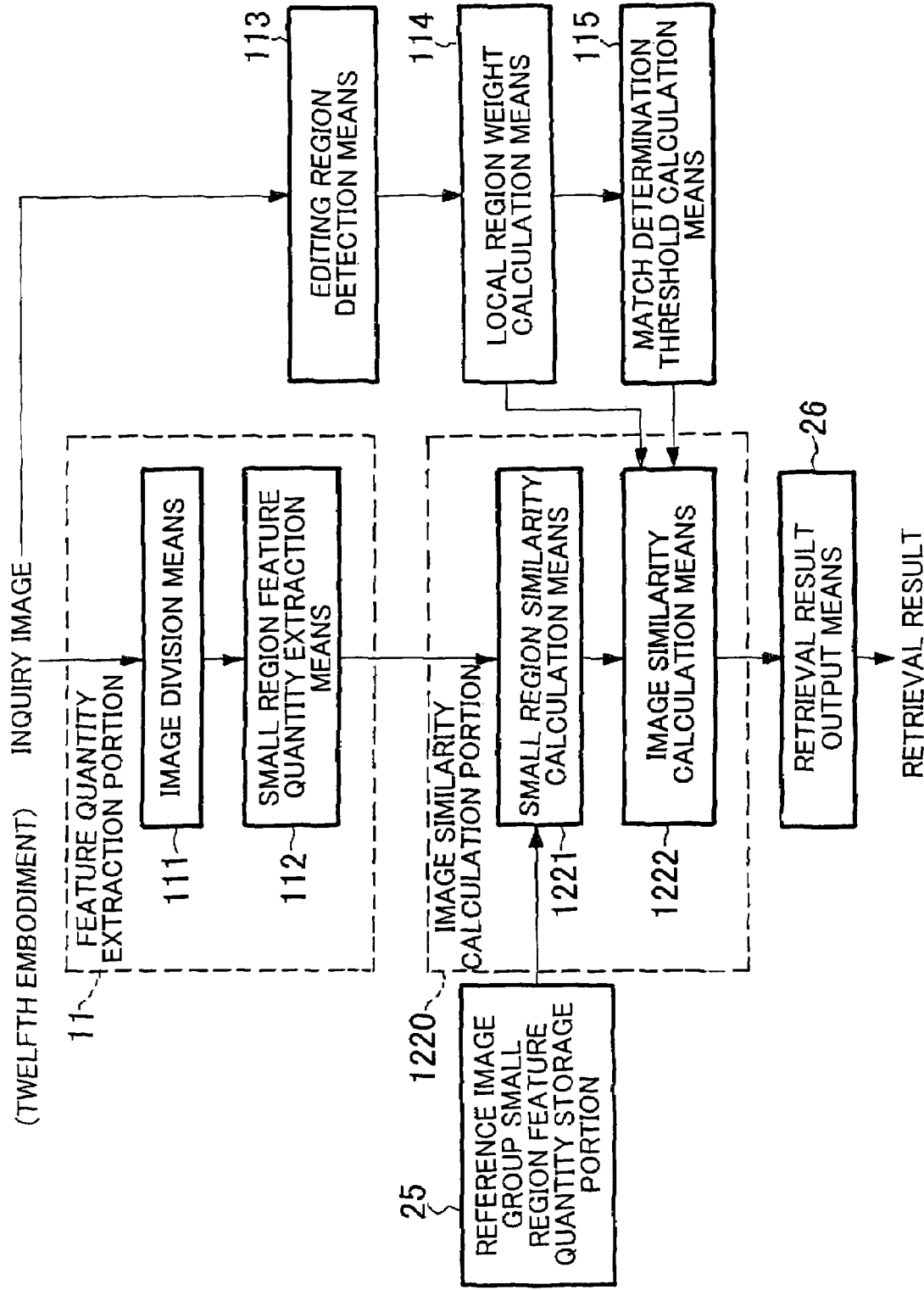

US 7,991,232 B2

IMAGE SIMILARITY CALCULATION SYSTEM, IMAGE SEARCH SYSTEM, IMAGE SIMILARITY CALCULATION METHOD, AND IMAGE SIMILARITY CALCULATION PROGRAM

TECHNICAL FIELD

The present invention relates to an image similarity calculation system, an image similarity calculation method, an image similarity calculation program for calculating similarities of multiple images, and an image retrieval system for retrieving an image similar to an inquiry image. More specifically, the present invention relates to an image similarity calculation system, an image similarity calculation method, an image similarity calculation program for calculating a similarity between an original image and an edited image, and an image retrieval system for retrieving an image similar to an edited inquiry image.

BACKGROUND ART

There is an image similarity calculation method of calculating similarity between two images to be compared with each other. Generally, such image similarity calculation method is used for calculating a similarity between an inquiry image and an image for retrieval, in an image retrieval system for retrieving an image similar to the inquiry image from a group of registered images.

Patent Document 1 describes an example of the conventional image retrieval method. The image retrieval method described in Patent Document 1 divides an image into multiple blocks and calculates the feature quantity of each block. Further, the image retrieval method provides each block with a label in accordance with the feature quantity obtained for each block and generates a label matrix by arranging labels in a specified order. The image retrieval method calculates an image similarity between the inquiry image and an image for retrieval as a similarity of label columns obtained from these images. In retrieval, images for retrieval for which similarities exceed a threshold value are output as a retrieval result.

Patent Document 2 describes an image retrieval method of retrieving an image partially similar to an inquiry image. The image retrieval method described in Patent Document 2 inputs an inquiry image and an inquiry area, i.e., an area for retrieval in the inquiry image. The method divides an inquiry image into blocks. A weight is defined in accordance with an overlapping area between each block and the inquiry area. The method uses the weight to weight the feature quantity of each block to calculate the feature quantity. Similarly, the method calculates the feature quantity of an image for retrieval and compares both feature quantities to calculate the image similarity. In retrieval, images with high image similarities are output as a retrieval result.

Patent Document 3 describes an image retrieval method reflecting user's retrieval intention. The image retrieval method described in Patent Document 3 divides an inquiry image and an image for retrieval into multiple areas and allows a user to define different weights for the divided areas. The method obtains a similarity by comparing feature quantities of the corresponding divided areas between the inquiry image and the image for retrieval. The method applies the weight defined for each divided area to the similarity to calculate an image similarity. Since a user can specify an area that needs special attention during retrieval, it is possible to perform the image retrieval reflecting the user's retrieval intention.

Patent Document 1: JP-A-1999-312248 (paragraphs 0012 through 0013, FIGS. 9 and 13)
Patent Document 2: JP-A-2000-163576 (paragraphs 0017 through 0020, FIGS. 7 and 8)
Patent Document 3: JP-A-2001-134765 (paragraphs 0028 through 0031, FIG. 11)

DISCLOSURE OF THE INVENTION

However, the method described in Patent Document 1 assumes identity between an inquiry image and an image for retrieval. An image may be variously edited by superposing a ticker on it or partially cutting or cropping the image to partially change the image's pattern. The method calculates a small value for the image similarity between such changed image and an original image before the editing. There is a problem of inability to obtain sufficient throughput to determine or retrieve an original image from the edited image.

While the method described in Patent Document 2 can deal with an edited image with partially different patterns, it is necessary to previously specify an area targeted for the retrieval. Likewise, the method described in Patent Document 3 assigns a weight value to each area in the image, necessitating a user to specify an area that needs special attention during retrieval. Accordingly, the user needs to previously specify an unedited area to calculate the image similarity for the purpose of determining or retrieving an original image before the editing from the edited image. There is a problem of causing great inconvenience to users.

The present invention has been made to solve the above-mentioned problems. An object of the present invention is therefore to provide an image similarity calculation system, an image retrieval system, an image similarity calculation method, and an image similarity calculation program capable of calculating the image similarity as a large value between an edited image and an original image before editing without causing inconvenience of specifying an area to users so as to accurately determine or retrieve the original image before editing from the edited image with partially changed patterns.

According to the present invention, there is provided an image similarity calculation system, an image similarity calculation method, and an image similarity calculation program configured to: use a probability model of a probability for an editing process to be applied to an image; compare a feature quantity for each divided small region of the inquiry image with a feature quantity for each divided small region of the reference image; and calculate an image similarity between an inquiry image and a reference image.

According to another embodiment of the present invention, there is provided an image similarity calculation system, an image similarity calculation method, and an image similarity calculation program configured to: compare a feature quantity for each divided small region of an inquiry image with a feature quantity for each divided small region of an reference image, taking into account a probability model of a probability for an editing process to be applied to each region of an image; and calculate an image similarity between the inquiry image and the reference image.

According to still another embodiment of the present invention, there is provided an image similarity calculation system, an image similarity calculation method, and an image similarity calculation program configured to: compare a feature quantity for each divided small region of an inquiry image with a feature quantity for each divided small region of a reference image; and calculate an image similarity between the inquiry image and the reference image, using a probability model of a probability for an editing process to be applied to an image.

According to yet another embodiment of the present invention, an image similarity calculation system, an image similarity calculation method, and an image similarity calculation program configured to: compare a feature quantity for each divided small region of an inquiry image with a feature quantity for each divided small region of a reference image, using a probability model of a probability for an editing process to be applied to each region of an image; and calculate image similarity between the inquiry image and the reference image, using the probability model.

According to a preferred embodiment of the present invention, for example, there is provided an image similarity calculation system comprising: local region weight calculation means configured to calculate an image-region-based weight value based on a probability for an editing process to be applied to an image for each region; small region similarity calculation means configured to compare a feature quantity for each divided small region of an inquiry image with a feature quantity for each divided small region of a reference image to calculate a similarity of feature quantities for the respective small regions; and image similarity calculation means configured to apply a region-based weight value to the calculated small-region-based similarity to calculate an image similarity between the inquiry image and the reference image. The above-mentioned construction is used to calculate the image similarity in consideration for editing probability for each image region. This makes it possible to eliminate the effect of a highly possibly edited region during determination of image similarities. It is possible to yield a large value for the image similarity between the edited image and the original image.

According to a preferred embodiment of the present invention, for example, there is provided an image similarity calculation system comprising: match determination threshold determination means configured to calculate a threshold value of determining a match between images based on a probability for an editing process to be applied to an image for each region; small region similarity calculation means configured to compare a feature quantity for each small region resulting from dividing an inquiry image with a feature quantity for each small region resulting from dividing a reference image to calculate a similarity of feature quantities for the respective small regions; and image similarity calculation means configured to calculate an overall image's similarity from the calculated small-region-based similarities, modify the overall image's similarity using a threshold value to determine a match, and calculate an image similarity between the inquiry image and the reference image. By this construction, probability distribution of similarities between images is estimated based on the probability model of a probability for an editing process to be applied to an image, and an optimum threshold value to determine whether or not there is a match between two images to be compared is calculated. This threshold value is used to modify the similarity between images. It is possible to yield a large value for the image similarity between the edited image and the original image and to yield a small value for the image similarity between two images completely irrelevant to each other. Further, it is possible to calculate an image similarity suited for determining whether or not an edited inquiry image is generated from the reference image.

According to a preferred embodiment of the present invention, for example, there is provided an image retrieval system comprising: editing probability model estimation means configured to calculate local region editing probability, i.e., probability for an editing process to be applied an image for each local region using a learning image or a device characteristic supplied as an input; local region weight calculation means configured to calculate a local region weight value, i.e., a weight value for each local region in an image based on the local region editing probability; image division means configured to divide an edited inquiry image supplied as input into small regions; small region feature quantity extraction means configured to extract an inquiry image small region feature quantity, i.e., a feature quantity for each small region from the divided small regions; reference image group small region feature quantity storage means configured to store small region feature quantities for respective reference images in a reference image group composed of a plurality of previously registered reference images; small region similarity calculation means configured to compare a small region feature quantity of each reference image stored in the reference image group small region feature quantity storage portion with the inquiry image small region feature quantity and to calculate a small region similarity, i.e., a similarity of small-region-based feature quantities for each reference image; image similarity calculation means configured to weight a small region similarity calculated by the small region similarity calculation means for each of the reference images using a small-region-based weight value found from the local region weight value, and to calculate an image similarity between the inquiry image and each reference image in the reference image group; and retrieval result output means configured to output a retrieval result for the inquiry image from the reference image group based on an image similarity calculated by the image similarity calculation means for each reference image. The above-mentioned construction is used to calculate an image similarity in consideration for image-region-based editing probability. This makes it possible to eliminate the effect of a highly possibly edited region during determination of image similarities. It is possible to yield a large value for the image similarity between the edited image and the original image.

A first effect of the present invention is to be capable of yielding a large value for the image similarity between an edited image and the original image. The reason is that the present invention calculates an image similarity in consideration for a probability model of a probability for an editing process to be applied to images and is therefore capable of eliminating the effect of a highly possibly edited region during calculation of image similarities.

A second effect of the present invention is to be capable of accurately retrieving the original image from an edited image. The reason is that the present invention retrieves images using the image similarity calculation method having the first effect capable of yielding a large value for the image similarity between an edited image and the original image.

BRIEF DESCRIPTION OF THE DRAWINGS

FIG. 4 is a block diagram showing a modification of the first embodiment;

FIGS. 5A-5C are explanatory diagrams showing an example of local region editing probability stored in editing probability model storage means;

FIG. 7 is a block diagram showing the configuration of a second embodiment of the present invention;

FIG. 8 is a flowchart showing operations of the second embodiment of the present invention;

FIG. 9 is a block diagram showing the configuration of a third embodiment of the present invention;

FIG. 10 is a block diagram showing the configuration of a fourth embodiment of the present invention;

FIG. 11 is a block diagram showing the configuration of a fifth embodiment of the present invention;

FIG. 12 is a flowchart showing operations of the fifth embodiment of the present invention;

FIG. 13 is a block diagram showing the configuration of a sixth embodiment of the present invention;

FIG. 14 is a flowchart showing operations of the sixth embodiment of the present invention;

FIG. 15 is a block diagram showing the configuration of a seventh embodiment of the present invention;

FIG. 16 is a block diagram showing the configuration of an eighth embodiment of the present invention;

FIG. 17 is a block diagram showing the configuration of a ninth embodiment of the present invention;

FIG. 18 is a block diagram showing the configuration of a tenth embodiment of the present invention;

FIG. 19 is a block diagram showing the configuration of an eleventh embodiment of the present invention; and FIG. 20 is a block diagram showing the configuration of a twelfth embodiment of the present invention.

EXPLANATION OF REFERENCE NUMERALS

Figure 1:
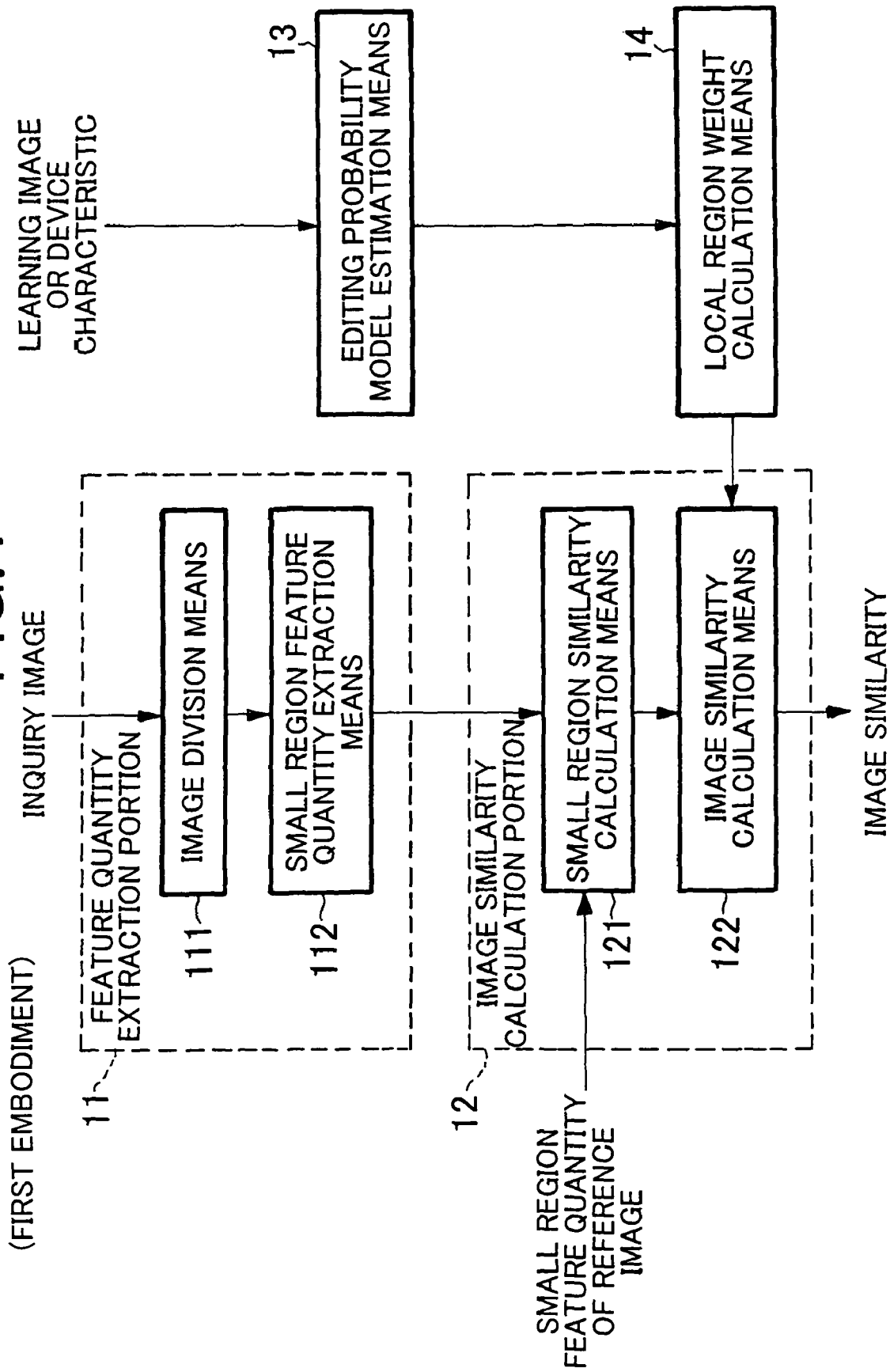
FIG. 1 is a block diagram showing the configuration of a first embodiment of the present invention.

11: Feature quantity extraction portion
111: Image division means
112: Small region feature quantity extraction means
12: Image similarity calculation portion
121: Small region similarity calculation means
122: Image similarity calculation means
13: Editing probability model estimation means
139: Editing probability model storage means
14: Local region weight calculation means
22: Image similarity calculation portion
221: Small region similarity calculation means
222: Image similarity calculation means
25: Reference image group small region feature quantity storage portion
26: Retrieval result output means
32: Image similarity calculation portion
321: Small region similarity calculation means
322: Image similarity calculation means
33: Editing region detection means
34: Local region weight calculation means
42: Image similarity calculation portion
421: Small region similarity calculation means
422: Image similarity calculation means
52: Image similarity calculation portion
521: Small region similarity calculation means
522: Image similarity calculation means
53: Editing probability model estimation means
54: Match determination threshold calculation means
62: Image similarity calculation portion
621: Small region similarity calculation means
622: Image similarity calculation means
72: Image similarity calculation portion
721: Small region similarity calculation means
722: Image similarity calculation means
73: Editing region detection means
74: Match determination threshold calculation means
82: Image similarity calculation portion
821: Small region similarity calculation means
822: Image similarity calculation means
92: Image similarity calculation portion
921: Small region similarity calculation means
922: Image similarity calculation means
93: Editing probability model estimation means
94: Local region weight calculation means
95: Match determination threshold calculation means
1020: Image similarity calculation portion
1021: Small region similarity calculation means
1022: Image similarity calculation means
1120: Image similarity calculation portion
1121: Small region similarity calculation means
1122: Image similarity calculation means
113: Editing region detection means
114: Local region weight calculation means
115: Match determination threshold calculation means
1220: Image similarity calculation portion
1221: Small region similarity calculation means
1222: Image similarity calculation means

BEST MODE FOR CARRYING OUT THE INVENTION

The best mode for carrying out the present invention will be described in detail with reference to the accompanying drawings.

First Embodiment

A first embodiment of the present invention will be described with reference to the accompanying drawings. As shown in a block diagram of FIG. 1, the first embodiment of the image similarity calculation system according to the present invention is functionally composed of a feature quantity extraction portion 11, an image similarity calculation portion 12, an editing probability model estimation means (an example of editing probability calculation means) 13, and a local region weight calculation means 14.

The feature quantity extraction portion 11 functionally includes an image division means 111 and a small region feature quantity extraction means 112.

When an edited inquiry image is input, the image division means 111 divides the inquiry image into small regions. The image division means 111 outputs the inquiry image divided into small regions to the small region feature quantity extraction means 112. The editing process signifies partially changing an image pattern. Editing examples include overlaying superposing objects such as a ticker, a caption, and a character on an image, partially cutting or cropping an image, and partially mosaicking or blurring an image. There is available any method of dividing an image into small regions. The method of dividing an image into small regions provides examples such as dividing an image into equally sized rectangles, dividing an image into irregularly sized rectangles, and dividing an image into diversely sized shapes such as circles and triangles other than rectangles. However, the present invention is not limited to these division methods. An image may be divided so that small regions partially overlap with each other. The entire image need not be divided into small regions. Only part of the image may be divided into small regions.

The small region feature quantity extraction means 112 extracts the feature quantity for each small region from an inquiry image that is divided into small regions input from the image division means 11. The small region feature quantity extraction means 112 outputs the extracted small region feature quantity for the inquiry image to the small region similarity calculation means 121. Examples of small region feature quantities to be extracted include color information, edge information, texture information, shape information, and motion information. The present invention is not limited thereto.

The small region feature quantities concerning the color information are exemplified by representative values such as an average value, a mode value, and a median value for all pixel values in each small region, and an occurrence histogram for pixel values. Pixel values signify coordinate values used for various color spaces such as RGB color space, HSV color space, YUV color space, YIQ color space, YCbCr color space, L*a*b* color space, and XYZ color space. It may be preferable to use feature quantities concerning color information such as Dominant Color, Color Layout, Scalable Color, and Color Structure specified in international standard ISO/IEC 15938-3.

As an example of the small region feature quantity concerning the edge information, it may be preferable to use a feature quantity (hereafter referred to as an edge element feature quantity) to describe the global edge pattern for each small region as the best matching pattern among the multiple edge patterns. Further, it may be preferable to use an occurrence histogram for a local edge pattern in each small region. Moreover, it may be preferable to use Edge Histogram specified in ISO/IEC 15938-3. Examples of feature quantities concerning the texture information include Homogeneous Texture and Texture Browsing specified in ISO/IEC15938-3. Examples of feature quantities concerning the shape information include Region Shape, Contour Shape, and Shape 3D specified in ISO/IEC 15938-3.

When the inquiry image is a frame image in a moving picture, it may be preferable to use the motion information as the small region feature quantity. Examples of feature quantities for the motion information include Parametric Motion and Motion Activity specified in ISO/IEC 15938-3.

The editing probability model estimation means 13 calculates local region editing probability, i.e., probability of an editing process applied to each local region in an image, from an edited learning image(/s) or characteristics of a device to perform the editing process supplied as input. The editing probability model estimation means 13 outputs the calculated local region editing probability to the local region weight calculation means 14. It is preferable that the local region corresponds to a small region divided by the image division means 111. In addition, the local region may correspond to any of multiple smaller regions resulting from further dividing a small region divided by the image division means 111. Moreover, the local region may correspond to each element of the image. Furthermore, the local region may correspond to any of regions divided in any shapes and sizes different from those for the small region division method for the image division means 111.

The learning image or images signify one or more edited images used as a basis for the editing probability model estimation means 13 to calculate the local region editing probability. When the present invention is applied to a video editing apparatus, for example, a frame image constituting any edited video can be used as the learning image. The learning image is not limited to a single type. The learning image may be categorized into types characteristic to places on a screen for applying editing processes such as superposing tickers. Examples of the types include news images used as a news program, sports images used as a sports program, and variety images used as a variety program. For example, a sports image is assumed to have high possibility of applying an editing process to peripheries of the screen. A variety program image is assumed to have high possibility of applying an editing process to the center of the screen. In this manner, it is a good practice to use the learning image for sports images independently of the learning image for variety program images. In this case, the editing probability model estimation means 13 calculates the type-based local region editing probability. A user can specify a type of inquiry image to use the local region editing probability corresponding to the type of inquiry image.

When an edited learning image(/s) is input, the local region editing probability is measured by specifying regions that an editing process was applied in the learning image. Methods of specifying edited regions may include not only manual methods, but also methods of automatically detecting editing processes such as the method (hereafter referred to as a ticker detection method) of separating image information from text information as described in JP-A-2003-179888. Characteristics of a device to perform editing processes may be supplied as input. In such case, there is available the method of measuring the local region editing probability based on editing patterns applied to an image by the device and based on information about the frequency of using each editing patterns.

Examples of the device characteristics include editing patterns applied by an editing device to an image and information about the frequency of using each editing patterns. For example, the present invention may be applied to video editing apparatuses. Using a given video editing apparatus may result in high possibility of processing one or more specific regions on a screen. Using another video editing apparatus may result in high possibility of editing one or more different specific regions on the screen. In this case, it is possible to use information indicating these regions to be edited as information indicative of editing patterns. Furthermore, for example, a sports image is assumed to have high possibility of applying an editing process to peripheral regions of the screen. A variety program image is assumed to have high possibility of applying an editing process to the center region of the screen. In this case, it is possible to use information indicating these regions to be edited as information indicative of editing patterns. That is, the device characteristics include not only the device characteristics as originally implied, but also editing patterns and the information about the frequency of using each editing patterns when a device (e.g., a ticker insertion apparatus) is used to vary editing patterns depending on image types.

The local region weight calculation means 14 calculates a local region weight value based on the local region editing probability supplied from the editing probability model estimation means 13. The local region weight value quantifies how effectively the feature quantity extracted from local regions of an image works for calculation of the similarity for the overall image. The local region weight calculation means 14 outputs the calculated local region weight value to the image similarity calculation means 122. It is effective to set a larger local region weight value in proportion to a decrease in the local region editing probability attributed to the local region. There is an example of the method for calculating the local region weight value as follows.

Local region weight value=1−local region editing probability

The present invention is not limited thereto. A small local region weight value may be assigned when the local region editing probability is high. A large local region weight value may be assigned when the local region editing probability is low. During the image similarity calculation process, it may be preferable to use the other calculation methods capable of eliminating the effect of a highly possibly edited region.

Like the local region in the editing probability model estimation means 13, it is preferable that the local region corresponds to a small region divided by the image division means 111. In addition, the local region may correspond to any of multiple smaller regions resulting from further dividing a small region divided by the image division means 111. Furthermore, the local region may correspond to each element of the image. Still further, the local region may correspond to any of regions divided in any shapes and sizes different from those for the small region division method for the image division means 111.

The image similarity calculation portion 12 functionally includes the small region similarity calculation means 121 and the image similarity calculation means 122.

The small region similarity calculation means 121 compares the small region feature quantity for an inquiry image supplied from the small region feature quantity extraction means 112 with the small region feature quantity for a reference image supplied as input. The small region similarity calculation means 121 calculates a small region similarity, i.e., a similarity of the feature quantity for each small region. The small region similarity calculation means 121 outputs the calculated small region similarity to the image similarity calculation means 122. Any method of calculating the small region similarity can be settled according to the small region feature quantity to be used. For example, when the small region feature quantity to be used is a representative value such as an average value, a mode value, or a median value for the small region's color, there is a method of calculating the similarity based on a distance value and a correlation value in a color space being used. When the small region feature quantity to be used is an occurrence histogram for colors and edge elements, there is a method of calculating the similarity between histograms.

The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. The reference image supplied as input contains a small region concerning the small region feature quantity. It is preferable that this small region corresponds to a small region concerning the small region feature quantity for the inquiry image input from the small region feature quantity extraction means 112. This is because corresponding small regions can be directly compared with each other.

Different image division methods may cause a discrepancy between the inquiry image's small region and the reference image's small region. In this case, it is a good practice to use either image's small region feature quantity to complement the feature quantity corresponding to the other image's small region and then calculate the similarity. For example, a small region concerning the reference image's small region feature quantity may result from further dividing the small region concerning the inquiry image's small region feature quantity into multiple smaller regions. In this case, it is possible to generate the feature quantity corresponding to the inquiry image's small region by calculating an average value for the reference image's multiple small region feature quantities. There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The small region similarity calculation means 121 inputs the small region similarity to the image similarity calculation means 122. The image similarity calculation means 122 weights this small region similarity using a weight value for each small region found from a local region weight value input from the local region weight calculation means 14. The image similarity calculation means 122 calculates an image similarity, i.e., a similarity for the overall image, from the resulting weighted small region similarities and outputs the calculated image similarity. Methods of calculating the image similarity include finding a total sum of weighted small region similarities for all small regions or finding an average value thereof.

If the local region of the local region weight value input from the local region weight calculation means 14 corresponds to a small region of the small region similarity input from the small region similarity calculation means 121, the local region weight value can be directly used as a weight value for each small region. When the small region of the small region similarity does not correspond to the local region of the local region weight value, it is a good practice to use the local region weight value to complement the weight value corresponding to the small region of the small region similarity. For example, a local region of the local region weight value may result from further dividing a small region of the small region similarity into multiple smaller regions. In this case, it is possible to generate a weight value corresponding to the small region of the small region similarity by calculating an average value for multiple local region weight values. There may be a case where the local region division method concerning local region weight values uses shapes and sizes completely different from those for the small region division method concerning small region similarities. In this case, weight values of the multiple local regions which overlap with the small regions are then weighted in proportion to overlapping areas and are totaled. In this manner, it is possible to generate the weight value corresponding to the small region of the small region similarity.

The image similarity calculation system is implementable on a computer. The image similarity calculation system is composed of such components as the feature quantity extraction portion 11, the image similarity calculation portion 12, the editing probability model estimation means 13, and the local region weight calculation means 14. These components can be implemented as programs that allow the computer's central processing unit (CPU) to perform the above-mentioned functions. That is, the components constituting the image similarity calculation system are implementable on a computer and can be implemented as programs. This applies not only to the first embodiment, but also to the other embodiments to be described later.

Operations of the first embodiment will now be described with reference to the block diagram of FIG. 1 and a flowchart of FIG. 2.

A learning image or a device characteristic is supplied as input (step A1). The editing probability model estimation means 13 calculates a local region editing probability from the input learning image or device characteristic, i.e., a probability of applying the editing process to each local region of the image (step A2).

Figure 3:
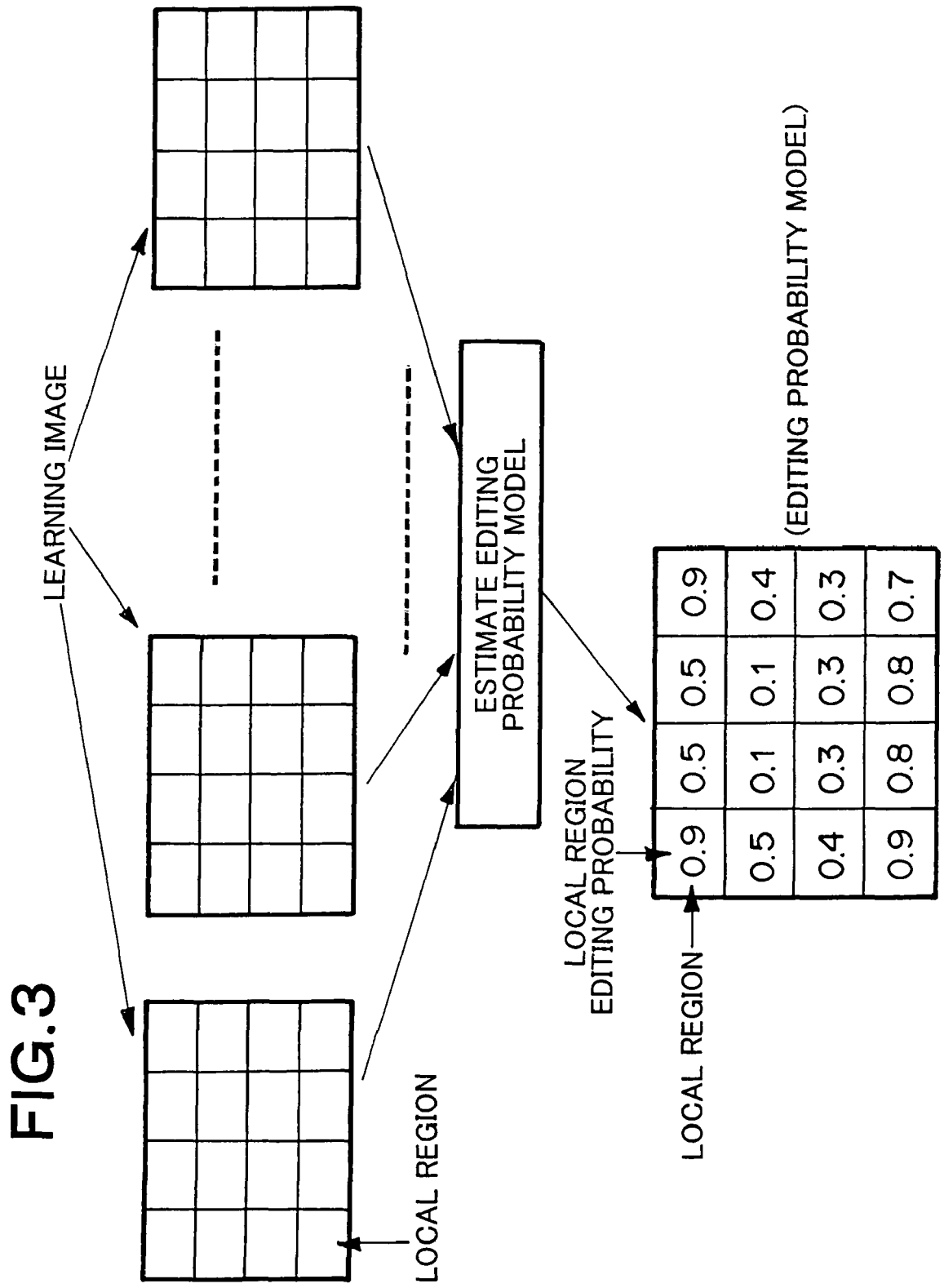
FIG. 3 is an explanatory diagram showing how to calculate local region editing probability.

FIG. 3 is an explanatory diagram showing how the editing probability model estimation means 13 calculates local region editing probability. According to the example shown in FIG. 3, an image region corresponding to image data is divided into 16 local regions. The editing probability model estimation means 13 indicates "1" when the editing process is applied to respective local regions for each image in multiple learning images. Otherwise, the editing probability model estimation means 13 indicates "0". The editing probability model estimation means 13 performs a process such as averaging each local region to calculate the probability that the editing process is applied to each local region. That is, the editing probability model estimation means 13 estimates a probability model indicative of local region editing probabilities. Here is described a mere example of the method of estimating a probability model. The other methods may be used.

The editing probability model estimation means 13 outputs the calculated local region editing probability to the local region weight calculation means 14. Based on the local region editing probability, the local region weight calculation means 14 calculates a local region weight value, i.e., a weight value for each local region in the image (step A3).

An edited inquiry image is supplied as input (step A4). The image division means 111 divides the input inquiry image into small regions and outputs the image divided into small regions to the small region feature quantity extraction means 112 (step A5). The small region feature quantity extraction means 112 extracts an inquiry image small region feature quantity, i.e., a feature quantity for each of small regions of the divided image. The small region feature quantity extraction means 112 then outputs the extracted inquiry image small region feature quantity to the small region similarity calculation means 121 (step A6). The reference image's small region feature quantity is supplied as input (step A7). The small region similarity calculation means 121 calculates a small region similarity, i.e., a feature quantity similarity between feature quantities obtained by comparing the input reference image's small region feature quantity with the inquiry image's small region feature quantity. The small region similarity calculation means 121 outputs the calculated small region similarity to the image similarity calculation means 122 (step A8). The image similarity calculation means 122 then weights the small region similarity using a weight value for each small region found from the local region weight value calculated by the local region weight calculation means 14 at step A3. The image similarity calculation means 122 calculates an image similarity between the inquiry image and the reference image (step A9). In this manner, the use of the local region weight value makes it possible to eliminate the effect of a highly possibly edited region. Lastly, the image similarity calculation means 122 outputs the calculated image similarity (step A10).

The first embodiment of the present invention supplies a similarity for each of small regions of the divided image with a weight calculated in consideration for a probability model of editing the image to calculate the image similarity. Consequently, the image similarity calculation can be free from the effect of a highly possibly edited region. It is possible to correctly measure a similarity between the state of the inquiry image before editing and the reference image. It is possible to yield a large value for the image similarity between the edited image and the original image. Further, the first embodiment of the present invention needs no process for detecting an edited region from the inquiry image. A local region weight value is calculated from the learning image or the device characteristic. Accordingly, another process can be used to find the local region weight value in advance, making it possible to fast calculate the image similarity.

According to the embodiment, the image similarity calculation means 122 calculates an image similarity in consideration for a probability model of editing an image estimated by the editing probability model estimation means 13, specifically, in consideration for a probability model of editing the image for each local region. In addition, the small region similarity calculation means 121 may compare the input reference image's small region feature quantity with the inquiry image's small region feature quantity in consideration for a probability model and calculate a small region similarity, i.e., a similarity between feature quantities for small regions. For example, it may be preferable to provide a highly possibly edited small region with a process of adjusting the small region similarity to a small value. It should be noted that the small region similarity calculation means 121 may calculate a small region similarity in consideration for the probability model. This also applies to the other embodiments to be described below.

The editing probability model estimation means 13 need not calculate the local region editing probability at the timing corresponding to input of each inquiry image. For example, the editing probability model estimation means 13 may calculate the local region editing probability at the time of installing an apparatus or a system to which the present invention is applied, or at a later periodic time point. The editing probability model estimation means 13 maintains a calculation result. When an inquiry image is input, the editing probability model estimation means 13 outputs the maintained local region editing probability to the local region weight calculation means 14. This also applies to editing probability model estimation means according to the other embodiments to be described later.

Accordingly, it may be preferable to previously calculate the local region editing probability and store the calculated local region editing probability in storage means such as ROM. FIG. 4 is a block diagram showing a modification of the first embodiment. According to the modification, there is provided a storage means to store local region editing probabilities instead of the editing probability model estimation means 13.

According to the configuration as shown in FIG. 4, editing probability model storage means 139 stores the local region editing probability. It is preferable that the local region corresponds to a small region divided by the image division means 111. In addition, the local region may correspond to any of multiple smaller regions resulting from further dividing a small region divided by the image division means 111. Moreover, the local region may correspond to each element of the image. Furthermore, the local region may correspond to any of regions divided in any shapes and sizes different from those for the small region division method for the image division means 111. The local region editing probability may be stored not only as a value commonly used for all images, but also as different values according to types of images to be used such as news images, sports images, and variety images. In the latter case, a user can specify an inquiry image type to use the local region editing probability corresponding to the inquiry image type.

FIG. 5 is an explanatory diagram showing an example of local region editing probability stored in the editing probability model storage means 139. In this example, the editing probability model storage means 139 stores probability of editing each of local regions divided from an image corresponding to the types of news, sports, and variety images. The news or sports image is highly possibly edited at the top left, top right, and bottom of the image. Therefore, large values are assigned to local region editing probabilities for the corresponding local regions. The variety image also contains large values for probabilities of applying the editing process at the center of the image.

Figure 2:
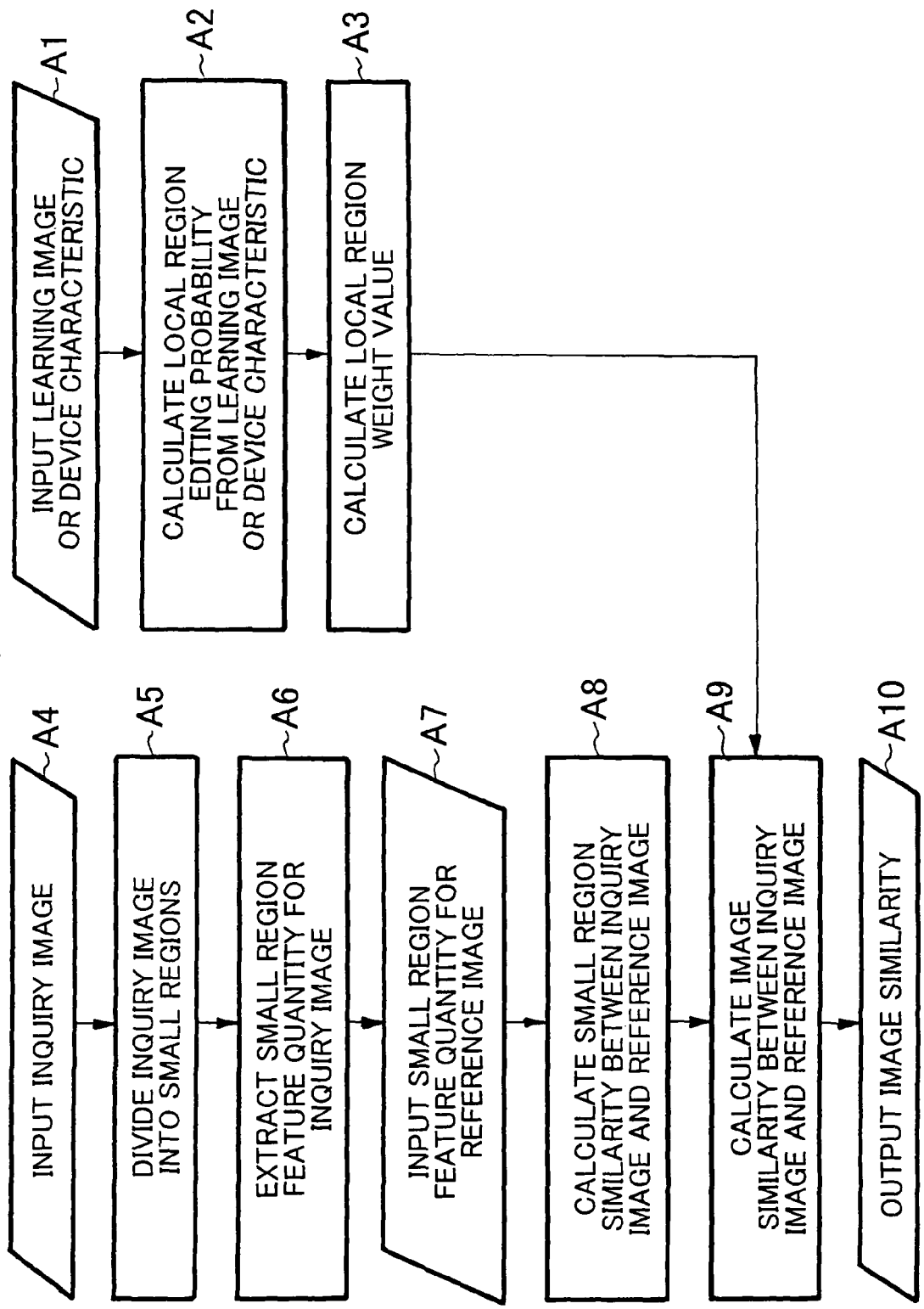
FIG. 2 is a flowchart showing operations of the first embodiment of the present invention.

The blocks other than the editing probability model storage means 139 in FIG. 4 have the same configurations and operations as those of the blocks shown in FIG. 1. This modification eliminates the need to provide the editing probability model estimation means 13 having the calculation function.

Figure 6:
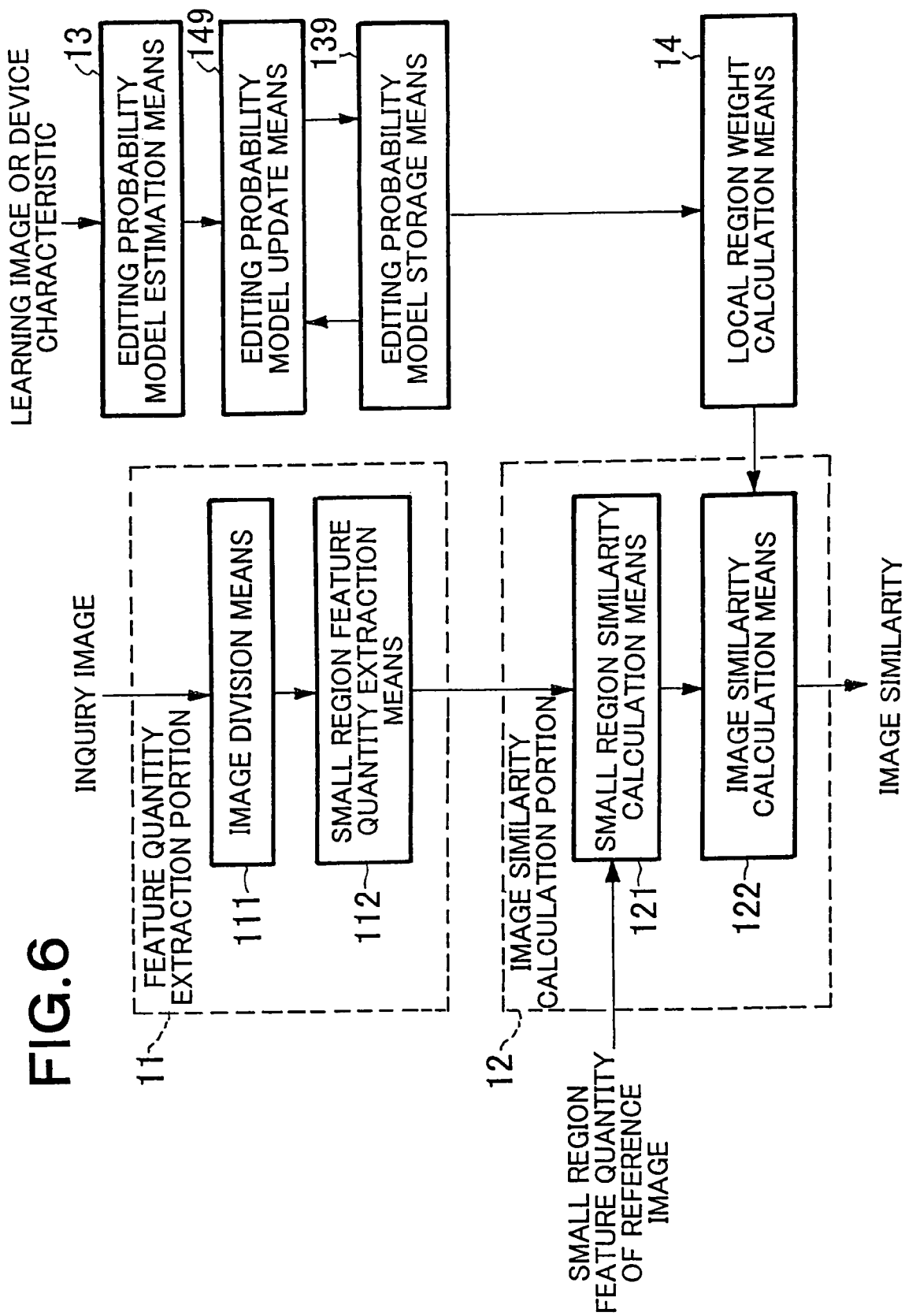
FIG. 6 is a block diagram showing another modification of the first embodiment.

It may be preferable to store local region editing probabilities in a rewritable storage means such as flash memory and enable local region editing probabilities to be changed. FIG. 6 is a block diagram showing another modification of the first embodiment. According to the modification, there is provided a rewritable storage means to store local region editing probabilities instead of the editing probability model estimation means 13.

According to the configuration shown in FIG. 6, the editing probability model estimation means 13 calculates local region editing probability, i.e., probability of an editing process applied to each local region in an image from an edited learning image or characteristics of a device to perform the editing process supplied as additional input on an as-needed basis. The editing probability model estimation means 13 outputs the calculated local region editing probability to an editing probability model update means 149. The editing probability model estimation means 13 is supplied with a learning image or characteristics of a device to perform the editing process periodically or at occurrence of an event that may greatly change the editing probability model, for example.

The editing probability model update means 149 reads a local region editing probability prestored in the editing probability model storage means 139. The editing probability model update means 149 updates the local region editing probability using a local region editing probability read from the editing probability model storage means 139 and a local region editing probability input from the editing probability model estimation means 13. The editing probability model update means 149 stores the updated local region editing probability in the editing probability model storage means 139. In addition, the editing probability model update means 149 may update the local region editing probability by storing a new local region editing probability read from the editing probability model storage means 139 unchangedly in the editing probability model storage means 139.

The blocks other than the editing probability model update means 149 and the editing probability model storage means 139 shown in FIG. 6 have the same configurations and operations as those of the blocks shown in FIG. 1. This modification can maintain proper contents of the local region editing probability stored in the editing probability model storage means 139.

Second Embodiment

The second embodiment of the present invention will be described in further detail with reference to the accompanying drawings. As shown in a block diagram of FIG. 7, the second embodiment differs from the first embodiment as follows. The second embodiment of the image similarity calculation system according to the present invention replaces the image similarity calculation portion 12 in FIG. 1 according to the first embodiment with an image similarity calculation portion 22. The second embodiment includes a reference image group small region feature quantity storage portion 25 and a retrieval result output means 26. The second embodiment provides an image similarity calculation system having the reference image group small region feature quantity storage portion 25 and the retrieval result output means 26. Such system implements an image retrieval system.

The reference image group small region feature quantity storage portion 25 stores small region feature quantities for prestored multiple reference images. The reference image group small region feature quantity storage portion 25 stores small region feature quantities for respective reference images. It is preferable that the small region concerning each of these small region feature quantities corresponds to an inquiry image's small region divided by the image division means 111. In addition, the small region may be a division shaped and sized differently from the inquiry image's small region.

The image similarity calculation portion 22 functionally includes small region similarity calculation means 221 and image similarity calculation means 222.

The small region similarity calculation means 221 reads small region feature quantities for multiple reference images from the reference image group small region feature quantity storage portion 25 on an image basis. The small region similarity calculation means 221 compares the read small region feature quantity for each of the reference images with the inquiry image's small region feature quantity input from the small region feature quantity extraction means 112. The small region similarity calculation means 221 calculates a small region similarity, i.e., a feature quantity similarity for each small region. The small region similarity calculation means 221 outputs the calculated small region similarity for each reference image in the reference image group to the image similarity calculation means 222.

Any method of calculating the small region similarity can be settled according to the small region feature quantity to be used. For example, when the small region feature quantity to be used is a representative value such as an average value, a mode value, or a median value for the small region's color, there is a method of calculating the similarity based on a distance value and a correlation value in a color space being used. When the small region feature quantity to be used is an occurrence histogram for colors and edge elements, there is a method of calculating the similarity between histograms.

The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in international standard ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. Different image division methods may cause a discrepancy between a small region concerning the small region feature quantity for the inquiry image input from the small region feature quantity extraction means 112 and a small region concerning the small region feature quantity for the reference image read from the reference image group small region feature quantity storage portion 25. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The image similarity calculation means 222 is supplied with the small region similarity for each reference image in the reference image group from the small region similarity calculation means 221. The image similarity calculation means 222 weights the supplied small region similarity using a small-region-based weight value found from local region weight values supplied from the local region weight calculation means 14. The image similarity calculation means 222 calculates an image similarity, i.e., a similarity for the overall image, from the resulting weighted small region similarities. The image similarity calculation means 222 outputs the calculated image similarity for each reference image in the reference image group to the retrieval result output means 26.

Methods of calculating the image similarity include finding a total sum of weighted small region similarities for all small regions or finding an average value thereof. If the local region of the local region weight value input from the local region weight calculation means 14 corresponds to a small region of the small region similarity input from the small region similarity calculation means 121, the local region weight value can be directly used as a weight value for each small region. When the small region of the small region similarity does not correspond to the local region of the local region weight value, it is a good practice to use the local region weight value to complement the weight value corresponding to the small region of the small region similarity. For example, a local region of the local region weight value may result from further dividing a small region having the small region similarity into multiple smaller regions. In this case, it is possible to generate a weight value corresponding to the small region of the small region similarity by calculating an average value for multiple local region weight values.

There may be a case where the local region division method concerning local region weight values uses shapes and sizes completely different from those for the small region division method concerning small region similarities. In this case, weight values of the multiple local regions which overlap with the small regions are then weighted in proportion to overlapping areas and are totaled. In this manner, it is possible to generate the weight value corresponding to the small region of the small region similarity.

The retrieval result output means 26 operates based on image similarities for reference images in the reference image group supplied from the image similarity calculation means 222 and outputs a retrieval result for the inquiry image from the reference image group. There is a retrieval method of outputting a reference image having the largest image similarity out of all reference images in the reference image group. Further, it may be preferable to compare image similarities for reference images in the reference image group with a predetermined threshold value and output all reference images whose image similarities are equal to or greater than the threshold value.

Operations of the second embodiment will now be described with reference to the block diagram of FIG. 7 and a flowchart of FIG. 8.

As the editing probability model estimation means 13 is supplied with a learning image or a device characteristic as input (step B1), it calculates a local region editing probability, i.e., a probability of editing each local region in the image, from the input learning image or device characteristic. The editing probability model estimation means 13 outputs the calculated local region editing probability to the local region weight calculation means 14 (step B2). The local region weight calculation means 14 calculates a local region weight value, i.e., a weight value for each local region in the image, based on the local region editing probability (step B3).

As the image division means 111 is supplied with the edited inquiry image as input (step B4), it divides the input inquiry image into small regions and outputs the image divided into small region to the small region feature quantity extraction means 112 (step B5). The small region feature quantity extraction means 112 extracts an inquiry image small region feature quantity, i.e., a feature quantity for each small region in the image divided into small regions. The small region feature quantity extraction means 112 outputs the extracted inquiry image small region feature quantity to the small region similarity calculation means 221 (step B6). The small region similarity calculation means 221 reads the small region feature quantity for one reference image from the reference image group small region feature quantity storage portion 25 (step B7).

The small region similarity calculation means 221 compares the small region feature quantity of the one read reference image with the inquiry image small region feature quantity to calculate a small region similarity, i.e., a feature quantity similarity for each small region. The small region similarity calculation means 221 outputs the calculated small region similarity to the image similarity calculation means 222 (step B8). The image similarity calculation means 222 then weights the small region similarity using a weight value for each small region found from the local region weight value calculated by the local region weight calculation means 14 at step B3. The image similarity calculation means 222 calculates an image similarity between the one read reference image and the inquiry image (step B9). The process checks whether or not image similarities are calculated for all reference images stored in the reference image group small region feature quantity storage portion 25 (step B10). When there remains a reference image whose image similarity is not calculated, the process returns to step B7. When image similarities are calculated for all the reference images, the process proceeds to step B11. Finally, the retrieval result output means 26 outputs a retrieval result for the inquiry image from the reference image group based on the image similarities for all the reference images (step B11).

The second embodiment of the present invention retrieves images using the image similarity calculation method having the effect according to the first embodiment of the present invention. The second embodiment retrieves images using the image similarity calculated by eliminating effects of highly possibly edited regions. Accordingly, the second embodiment can accurately retrieve the original image from edited images. Similar to the first embodiment, the second embodiment requires no process to detect an edited region from the inquiry image and makes it possible to previously find the local region weight value, thus enabling fast image retrieval.

The modifications of the first embodiment can be also applied to the second embodiment. That is, the editing probability model storage means 139 may be provided instead of the editing probability model estimation means 13. It may be preferable to provide the editing probability model update means 149 and the editing probability model storage means 139.

Third Embodiment

The third embodiment of the present invention will be described in further detail with reference to the accompanying drawings. As shown in a block diagram of FIG. 9, the third embodiment of the image similarity calculation system according to the present invention is composed of the feature quantity extraction portion 11, an image similarity calculation portion 32, an editing region detection means (an example of editing probability calculation means) 33, and a local region weight calculation means 34. The feature quantity extraction portion 11 is the same as that provided for the first embodiment.

The editing region detection means 33 uses a method of automatically detecting edited regions such as the ticker detection method for an edited inquiry image supplied as input. Using this method, the editing region detection means 33 calculates a local region editing probability, i.e., a probability that an editing process was applied to each local region in the inquiry image. The editing region detection means 33 outputs the calculated local region editing probability to the local region weight calculation means 34. The local region editing probability may have any probability value or a binary value 1 or 0. The local region may correspond to any of multiple smaller regions resulting from further dividing a small region divided by the image division means 111. Moreover, the local region may correspond to each element of the image. Furthermore, the local region may correspond to any of regions divided in any shapes and sizes different from those for the small region division method for the image division means 111.

The local region weight calculation means 34 calculates a local region weight value based on the local region editing probability supplied from the editing region detection means 33. The local region weight value quantifies how effectively the feature quantity extracted from local regions of an image works for calculation of the similarity for the overall image. The local region weight calculation means 34 outputs the calculated local region weight value to the image similarity calculation means 322. It is preferable that the local region corresponds to a small region divided by the image division means 111. In addition, the local region may correspond to any of multiple smaller regions resulting from further dividing a small region divided by the image division means 111. Moreover, the local region may correspond to each element of the image. Furthermore, the local region may correspond to any of regions divided in any shapes and sizes different from those for the small region division method for the image division means 111. There is an example of the method for calculating the local region weight value as follows.

Local region weight value=1−local region editing probability

The present invention is not limited thereto. During the image similarity calculation process, it may be preferable to use the other calculation methods capable of eliminating the effect of a highly possibly edited region. The editing region detection means 33 may supply local region editing probabilities as binary probability values such as 1 and 0. In this case, there is a method of integrating multiple local regions into a new local region. The method finds a local region weight value as a ratio of an area of the local region having the local region editing probability value of 0 before the integration included in the local region after the integration.

The image similarity calculation portion 32 functionally includes a small region similarity calculation means 321 and an image similarity calculation means 322.

The small region similarity calculation means 321 compares the inquiry image's small region feature quantity supplied from the small region feature quantity extraction means 112 with the small region feature quantity of the reference image supplied as input. The small region similarity calculation means 321 calculates a small region similarity, i.e., a feature quantity similarity for each small region. The small region similarity calculation means 321 outputs the calculated small region similarity to the image similarity calculation means 322. Any method of calculating the small region similarity can be settled according to the small region feature quantity to be used. For example, when the small region feature quantity to be used is a representative value such as an average value, a mode value, or a median value for the small region's color, there is a method of calculating the similarity based on a distance value and a correlation value in a color space being used.

When the small region feature quantity to be used is an occurrence histogram for colors and edge elements, there is a method of calculating the similarity between histograms. The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. It is preferable that a small region concerning the small region feature quantity for the reference image supplied as input corresponds to a small region concerning the small region feature quantity for the inquiry image supplied from the small region feature quantity extraction means 112. This is because corresponding small regions can be directly compared with each other. Different image division methods may cause a discrepancy between the inquiry image's small region and the reference image's small region. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The small region similarity calculation means 321 inputs the small region similarity. The image similarity calculation means 322 weights this small region similarity using a weight value for each small region found from a local region weight value input from the local region weight calculation means 34. The image similarity calculation means 322 calculates an image similarity, i.e., a similarity for the overall image, from the resulting weighted small region similarities and outputs the calculated image similarity. Methods of calculating the image similarity include finding a total sum of weighted small region similarities for all small regions or finding an average value thereof.

If the local region of the local region weight value input from the local region weight calculation means 34 corresponds to a small region of the small region similarity input from the small region similarity calculation means 321, the local region weight value can be directly used as a weight value for each small region. When the small region of the small region similarity does not correspond to the local region of the local region weight value, it is a good practice to use the local region weight value to complement the weight value corresponding to the small region of the small region similarity. For example, a local region of the local region weight value may result from further dividing a small region of the small region similarity into multiple smaller regions. In this case, it is possible to generate a weight value corresponding to the small region of the small region similarity by calculating an average value for multiple local region weight values.

There may be a case where the local region division method concerning local region weight values uses shapes and sizes completely different from those for the small region division method concerning small region similarities. In this case, weight values of the multiple local regions which overlap with the small regions are then weighted in proportion to overlapping areas and are totaled. In this manner, it is possible to generate the weight value corresponding to the small region of the small region similarity.

Similar to the first embodiment, the third embodiment calculates an image similarity by eliminating the effect of a highly possibly edited region. Further, the third embodiment calculates a local region weight value based on the local region editing probability directly calculated from the inquiry image. The first embodiment heuristically finds a local region weight value as an average value from the learning image or the device characteristic. Differently from the first embodiment, the third embodiment calculates a local region weight value for each inquiry image, making it possible to calculate a larger value for the image similarity between the edited image and the original image. Further, the third embodiment requires no learning image or device characteristic as input.

Fourth Embodiment

The fourth embodiment of the present invention will be described in further detail with reference to the accompanying drawings. As shown in a block diagram of FIG. 10, the fourth embodiment differs from the third embodiment as follows. The fourth embodiment of the image similarity calculation system according to the present invention replaces the image similarity calculation portion 32 shown in FIG. 9 according to the third embodiment with an image similarity calculation portion 42. The fourth embodiment provides the reference image group small region feature quantity storage portion 25 and the retrieval result output means 26. The reference image group small region feature quantity storage portion 25 and the retrieval result output means 26 are the same as those provided for the second embodiment.

The image similarity calculation portion 42 functionally includes a small region similarity calculation means 421 and an image similarity calculation means 422.

The small region similarity calculation means 421 reads small region feature quantities for multiple reference images from the reference image group small region feature quantity storage portion 25 on an image basis. The small region similarity calculation means 421 compares the read small region feature quantity for each of the reference images with the inquiry image's small region feature quantity input from the small region feature quantity extraction means 112. The small region similarity calculation means 421 calculates a small region similarity, i.e., a feature quantity similarity for each small region. The small region similarity calculation means 421 outputs the calculated small region similarity for each reference image in the reference image group to the image similarity calculation means 422. Any method of calculating the small region similarity can be settled according to the small region feature quantity to be used. For example, when the small region feature quantity to be used is a representative value such as an average value, a mode value, or a median value for the small region's color, there is a method of calculating the similarity based on a distance value and a correlation value in a color space being used.

When the small region feature quantity to be used is an occurrence histogram for colors and edge elements, there is a method of calculating the similarity between histograms. The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in international standard ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. Different image division methods may cause a discrepancy between a small region concerning the small region feature quantity for the inquiry image input from the small region feature quantity extraction means 112 and a small region concerning the small region feature quantity for the reference image read from the reference image group small region feature quantity storage portion 25. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The image similarity calculation means 422 is supplied with the small region similarity for each reference image in the reference image group from the small region similarity calculation means 421. The image similarity calculation means 422 weights the supplied small region similarity using a small-region-based weight value found from local region weight values supplied from the local region weight calculation means 34. The image similarity calculation means 422 calculates an image similarity, i.e., a similarity for the overall image, from the resulting weighted small region similarities. The image similarity calculation means 422 outputs the calculated image similarity for each reference image in the reference image group to the retrieval result output means 26.

Methods of calculating the image similarity include finding a total sum of weighted small region similarities for all small regions or finding an average value thereof. If the local region of the local region weight value input from the local region weight calculation means 34 corresponds to a small region of the small region similarity input from the small region similarity calculation means 421, the local region weight value can be directly used as a weight value for each small region. When the small region of the small region similarity does not correspond to the local region of the local region weight value, it is a good practice to use the local region weight value to complement the weight value corresponding to the small region of the small region similarity. For example, a local region of the local region weight value may result from further dividing a small region of the small region similarity into multiple smaller regions. In this case, it is possible to generate a weight value corresponding to the small region of the small region similarity by calculating an average value for multiple local region weight values.

Further, there may be a case where the local region division method concerning local region weight values uses shapes and sizes completely different from those for the small region division method concerning small region similarities. In this case, weight values of the multiple local regions which overlap with the small regions are then weighted in proportion to overlapping areas and are totaled. In this manner, it is possible to generate the weight value corresponding to the small region of the small region similarity.

Similar to the second embodiment, the retrieval result output means 26 outputs a retrieval result.

The fourth embodiment retrieves images using the image similarity calculation method having the effect according to the third embodiment of the present invention. Differently from the second embodiment, the fourth embodiment calculates a local region weight value for each inquiry image, making it possible to more precisely retrieve the original image from an edited image. Similar to the third embodiment, the fourth embodiment requires no learning image or device characteristic as input.

Fifth Embodiment

The fifth embodiment of the present invention will be described in further detail with reference to the accompanying drawings. As shown in a block diagram of FIG. 11, the fifth embodiment of the image similarity calculation system according to the present invention is composed of the feature quantity extraction portion 11, an image similarity calculation portion 52, an editing probability model estimation means 53, and a match determination threshold calculation means 54. The feature quantity extraction portion 11 is the same as that provided for the first embodiment of the present invention.

The editing probability model estimation means (an example of editing probability calculation means) 53 calculates local region editing probability or editing-targeted local region count probability distribution from an edited learning image or characteristics of a device to perform the editing process supplied as input. The local region editing probability signifies probability of editing each local region in the image. The editing-targeted local region count probability distribution signifies probability distribution of the number of local regions in the image to be edited. The editing probability model estimation means 53 outputs the calculated local region editing probability or editing-targeted local region count probability distribution to the match determination threshold calculation means 54.

Examples of the device characteristic include editing patterns applied to an image by the editing device and information about the frequency of using each editing patterns. It is preferable that the local region corresponds to a small region divided by the image division means 111. In addition, the local region may correspond to any of multiple smaller regions resulting from further dividing a small region divided by the image division means 111. Moreover, the local region may correspond to each element of the image. Furthermore, the local region may correspond to any of regions divided in any shapes and sizes different from those for the small region division method for the image division means 111.

When an edited learning image is input as a learning image, the local region editing probability is measured by specifying regions that an editing process was applied in the learning image. Methods of specifying edited regions may include not only manual methods, but also methods of automatically detecting editing processes such as the ticker detection method. Characteristics of a device to perform editing processes may be supplied as input. In such case, there is available the method of measuring the local region editing probability based on editing patterns applied to an image by the device and based on information about the frequency of using each editing patterns.

The match determination threshold calculation means 54 operates as follows based on the local region editing probability or the editing-targeted local region count probability distribution supplied from the editing probability model estimation means 53. The match determination threshold calculation means 54 calculates a match determination threshold for the overall image's similarity found by an image similarity calculation means 522 to be described later. The match determination threshold represents an optimum threshold value for determining whether or not two compared images match. The match determination threshold calculation means 54 outputs the calculated match determination threshold to the image similarity calculation means 522. There is a method of calculating an optimum threshold value. The method estimates occurrence probability distribution of the overall image's similarity. The method estimates the occurrence probability distribution of the overall image's similarity found from similarities of the image's small regions between an edited image with partially varied patterns and the original image based on the local region editing probability or the editing-targeted local region count probability distribution. Based on the estimated occurrence probability distribution of the overall image's similarity, the method finds a threshold value that the probability of determining a mismatch (discrepancy) between the edited image and the original image is small enough. The method provides for effects of pattern changes due to the editing process while estimating the occurrence probability distribution of the overall image's similarity. In addition, it may be preferable to provide for effects of feature quantity variations due to noise occurrence resulting from re-encoding the image.

The image similarity calculation portion 52 functionally includes a small region similarity calculation means 521 and an image similarity calculation means 522.

The small region similarity calculation means 521 compares the small region feature quantity of an inquiry image supplied from the small region feature quantity extraction means 112 with that of a reference image supplied as input. The small region similarity calculation means 521 calculates a small region similarity, i.e., a feature quantity similarity for each small region. The small region similarity calculation means 521 outputs the calculated small region similarity to the image similarity calculation means 522. Any method of calculating the small region similarity may be settled according to the small region feature quantity to be used. For example, when the small region feature quantity to be used is a representative value such as an average value, a mode value, or a median value for the small region's color, there is a method of calculating the similarity based on a distance value and a correlation value in a color space being used.

When the small region feature quantity to be used is an occurrence histogram for colors and edge elements, there is a method of calculating the similarity between histograms. The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. It is preferable that a small region concerning the small region feature quantity for the reference image supplied as input corresponds to a small region concerning the small region feature quantity for the inquiry image supplied from the small region feature quantity extraction means 112. This is because corresponding small regions can be directly compared with each other. Different image division methods may cause a discrepancy between the inquiry image's small region and the reference image's small region. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The image similarity calculation means 522 calculates the overall image's similarity from small region similarities supplied from the small region similarity calculation means 521. The image similarity calculation means 522 modifies the calculated overall image's similarity using the match determination threshold supplied from the match determination threshold calculation means 54. The image similarity calculation means 522 outputs the modified similarity as an image similarity. Methods of calculating the overall image's similarity include finding a total sum of small region similarities for all small regions or finding an average value thereof. There is a method of modifying the overall image's similarity using the match determination threshold. The method modifies the similarity to 1 when the image similarity is equal to or greater than the match determination threshold. The method modifies the similarity to 0 when the image similarity is smaller than the match determination threshold.

Operations of the fifth embodiment will now be described with reference to the block diagram of FIG. 11 and a flowchart of FIG. 12.

As the editing probability model estimation means 53 is supplied with the learning image or the device characteristic as input (step C1), it calculates local region editing probability or editing-targeted local region count probability distribution from the supplied learning image or device characteristic. The local region editing probability signifies probability of editing each local region in the image. The editing-targeted local region count probability distribution signifies probability distribution of the number of local regions in the image to be edited. The editing probability model estimation means 53 outputs the calculated local region editing probability or editing-targeted local region count probability distribution to the match determination threshold calculation means 54 (step C2). Based on the local region editing probability or the editing-targeted local region count probability distribution, the match determination threshold calculation means 54 calculates a match determination threshold, i.e., a threshold value for determining a match between images (step C3).

As the image division means 111 is supplied with the edited inquiry image as input (step C4), it divides the input inquiry image into small regions. The image division means 111 outputs the image divided into small regions to the small region feature quantity extraction means 112 (step C5). The small region feature quantity extraction means 112 extracts an inquiry image small region feature quantity, i.e., a feature quantity for each of the divided small regions in the image. The small region feature quantity extraction means 112 outputs the extracted inquiry image small region feature quantity to the small region similarity calculation means 521 (step C6). The small region similarity calculation means 521 is supplied with the reference image's small region feature quantity as input (step C7). The small region similarity calculation means 521 compares the supplied reference image's small region feature quantity with the inquiry image small region feature quantity to calculate a small region similarity, i.e., a feature quantity similarity for each small region. The small region similarity calculation means 521 outputs the calculated small region similarity to the image similarity calculation means 522 (step C8). The image similarity calculation means 522 calculates the overall image's similarity from the small region similarities. The image similarity calculation means 522 modifies the overall image's similarity using the match determination threshold calculated by the match determination threshold calculation means 54 at step C3 to calculate an image similarity between the inquiry image and the reference image (step C9). Finally, the image similarity calculation means 522 outputs the calculated image similarity (step C10).

Based on a probability model for editing images, the fifth embodiment calculates an optimum threshold value for determining a match between two images to be compared. Based on this threshold value, the embodiment modifies a similarity between images to calculate the image similarity. The embodiment modifies the similarity based on the threshold value for determining a match between images. Accordingly, the embodiment can calculate an image similarity suited for determining whether or not an edited inquiry image is generated from the reference image. The fifth embodiment requires no process to detect an edited region from the inquiry image. The embodiment calculates the match determination threshold from a learning image or a device characteristic. Accordingly, it is possible to previously find the match determination threshold using another process and fast calculate the image similarity.

The modifications of the first embodiment can be also applied to the fifth embodiment. That is, the editing probability model storage means may be provided instead of the editing probability model estimation means 53. It may be preferable to provide the editing probability model update means and the editing probability model storage means.

Sixth Embodiment

The sixth embodiment of the present invention will be described in further detail with reference to the accompanying drawings. As shown in a block diagram of FIG. 13, the sixth embodiment differs from the fifth embodiment as follows. The sixth embodiment of the image similarity calculation system according to the present invention replaces the image similarity calculation portion 52 shown in FIG. 11 according to the fifth embodiment with an image similarity calculation portion 62. The sixth embodiment includes the reference image group small region feature quantity storage portion 25 and the retrieval result output means 26. The reference image group small region feature quantity storage portion 25 and the retrieval result output means 26 are the same as those provided for the second embodiment.

The image similarity calculation portion 62 functionally includes a small region similarity calculation means 621 and an image similarity calculation means 622.

The small region similarity calculation means 621 reads small region feature quantities for multiple reference images from the reference image group small region feature quantity storage portion 25 on an image basis. The small region similarity calculation means 621 compares the read small region feature quantity for each of the reference images with the inquiry image's small region feature quantity input from the small region feature quantity extraction means 112. The small region similarity calculation means 621 calculates a small region similarity, i.e., a feature quantity similarity for each small region. The small region similarity calculation means 621 outputs the calculated small region similarity for each reference image in the reference image group to the image similarity calculation means 622. Any method of calculating the small region similarity can be settled according to the small region feature quantity to be used.

For example, when the small region feature quantity to be used is a representative value such as an average value, a mode value, or a median value for the small region's color, there is a method of calculating the similarity based on a distance value and a correlation value in a color space being used. When the small region feature quantity to be used is an occurrence histogram for colors and edge elements, there is a method of calculating the similarity between histograms.

The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in international standard ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. Different image division methods may cause a discrepancy between a small region concerning the small region feature quantity for the inquiry image input from the small region feature quantity extraction means 112 and a small region concerning the small region feature quantity for the reference image read from the reference image group small region feature quantity storage portion 25. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The image similarity calculation means 622 calculates an overall image's similarity from small region similarities for the reference images in the reference image group supplied from the small region similarity calculation means 621. The image similarity calculation means 622 modifies the calculated overall image's similarity using the match determination threshold supplied from the match determination threshold calculation means 54. The image similarity calculation means 622 outputs an image similarity, i.e., a similarity of reference images in the reference image group, to the retrieval result output means 26. Methods of calculating the overall image's similarity include finding a total sum of small region similarities for all small regions or finding an average value thereof. There is a method of modifying the overall image's similarity using the match determination threshold. The method modifies the similarity to 1 when the image similarity is equal to or greater than the match determination threshold. The method modifies the similarity when the image similarity is smaller than the match determination threshold.

Similar to the second embodiment, the retrieval result output means 26 outputs a retrieval result.

Operations of the sixth embodiment will now be described with reference to the block diagram of FIG. 13 and a flowchart of FIG. 14.

As the editing probability model estimation means 53 is supplied with the learning image or the device characteristic as input (step D1), it calculates local region editing probability or editing-targeted local region count probability distribution from the supplied learning image or device characteristic. The local region editing probability signifies probability of editing each local region in the image. The editing-targeted local region count probability distribution signifies probability distribution of the number of local regions in the image to be edited. The editing probability model estimation means 53 outputs the calculated local region editing probability or editing-targeted local region count probability distribution to the match determination threshold calculation means 54 (step D2). Based on the local region editing probability or the editing-targeted local region count probability distribution, the match determination threshold calculation means 54 calculates a match determination threshold, i.e., a threshold value for determining a match between images (step D3).

The image division means 111 is supplied with the edited inquiry image as input (step D4). The image division means 111 divides the input inquiry image into small regions. The image division means 111 outputs the image divided into small regions to the small region feature quantity extraction means 112 (step D5). The small region feature quantity extraction means 112 extracts an inquiry image small region feature quantity, i.e., a feature quantity for each of the divided small regions in the image. The small region feature quantity extraction means 112 outputs the extracted inquiry image small region feature quantity to the small region similarity calculation means 621 (step D6). The small region similarity calculation means 621 reads the small region feature quantity for one reference image from the reference image group small region feature quantity storage portion 25 (step D7). The small region similarity calculation means 621 compares the small region feature quantity of the one read reference image with the inquiry image small region feature quantity to calculate a small region similarity, i.e., a feature quantity similarity for each small region. The small region similarity calculation means 621 outputs the calculated small region similarity to the image similarity calculation means 622 (step D8).

The image similarity calculation means 622 calculates the overall image's similarity from the small region similarities. The image similarity calculation means 622 modifies the overall image's similarity using the match determination threshold calculated by the match determination threshold calculation means 54 at step D3 to calculate an image similarity between the one read reference image and the inquiry image (step D9). The process checks whether or not image similarities are calculated for all reference images stored in the reference image group small region feature quantity storage portion 25 (step D10). When there remains a reference image whose image similarity is not calculated, the process returns to step D7. When image similarities are calculated for all the reference images, the process proceeds to step D11. Finally, the retrieval result output means 26 outputs a retrieval result for the inquiry image from the reference image group based on the image similarities for all the reference images (step D11).

The sixth embodiment retrieves images using the fifth embodiment that calculates an image similarity suited for determining whether or not an edited inquiry image is generated from the reference image. Even when the reference image group registers multiple original images for an edited inquiry image, the sixth embodiment can precisely retrieve all images determined to be the original image for the edited inquiry images. Similarly to the fifth embodiment, the sixth embodiment requires no process to detect an edited region from the inquiry image and makes it possible to previously find the match determination threshold, thus enabling fast image retrieval.

The modifications of the first embodiment can be also applied to the sixth embodiment. That is, the editing probability model storage means may be provided instead of the editing probability model estimation means 53. It may be preferable to provide the editing probability model update means and the editing probability model storage means.

Seventh Embodiment

The seventh embodiment of the present invention will be described in further detail with reference to the accompanying drawings. As shown in a block diagram of FIG. 15, the seventh embodiment of the image similarity calculation system according to the present invention is functionally composed of the feature quantity extraction portion 11, an image similarity calculation portion 72, an editing region detection means 73, and a match determination threshold calculation means 74. The feature quantity extraction portion 11 is the same as that provided for the first embodiment.

The editing region detection means 73 uses a method of automatically detecting edited regions such as the ticker detection method for an edited inquiry image supplied as input. Using this method, the editing region detection means 73 calculates local region editing probability or editing-targeted local region count probability distribution. The local region editing probability signifies a probability that an editing process was applied to each local region in the edited inquiry image. The editing-targeted local region count probability distribution signifies probability distribution of the number of local regions in the edited inquiry image that an editing process was applied. The editing region detection means 73 outputs the calculated local region editing probability or editing-targeted local region count probability distribution to the match determination threshold calculation means 74. The local region editing probability may have any probability value or a binary value 1 or 0. The local region may correspond to any of multiple smaller regions resulting from further dividing a small region divided by the image division means 111. Moreover, the local region may correspond to each element of the image. Furthermore, the local region may correspond to any of regions divided in any shapes and sizes different from those for the small region division method for the image division means 111.

The match determination threshold calculation means 74 operates as follows based on the local region editing probability or the editing-targeted local region count probability distribution supplied from the editing region detection means 73. The match determination threshold calculation means 74 calculates a match determination threshold for the overall image's similarity found by an image similarity calculation means 722 to be described later. The match determination threshold represents an optimum threshold value for determining whether or not two compared images match. The match determination threshold calculation means 74 outputs the calculated match determination threshold to the image similarity calculation means 722. There is a method of calculating an optimum threshold value. The method estimates occurrence probability distribution of the overall image's similarity. The method estimates the occurrence probability distribution of the overall image's similarity found from similarities of the image's small regions between an edited image with partially varied patterns and the original image based on the local region editing probability or the editing-targeted local region count probability distribution. Based on the estimated occurrence probability distribution of the overall image's similarity, the method finds a threshold value that the probability of determining a mismatch (discrepancy) between the edited image and the original image is small enough. The method provides for effects of pattern changes due to the editing process while estimating the occurrence probability distribution of the overall image's similarity. In addition, it may be preferable to provide for effects of feature quantity variations due to noise occurrence resulting from re-encoding the image.

The image similarity calculation portion 72 functionally includes a small region similarity calculation means 721 and an image similarity calculation means 722.

The small region similarity calculation means 721 compares the small region feature quantity of an inquiry image supplied from the small region feature quantity extraction means 112 with that of a reference image supplied as input. The small region similarity calculation means 721 calculates a small region similarity, i.e., a feature quantity similarity for each small region. The small region similarity calculation means 721 outputs the calculated small region similarity to the image similarity calculation means 722. Any method of calculating the small region similarity may be settled according to the small region feature quantity to be used. For example, when the small region feature quantity to be used is a representative value such as an average value, a mode value, or a median value for the small region's color, there is a method of calculating the similarity based on a distance value and a correlation value in a color space being used. When the small region feature quantity to be used is an occurrence histogram for colors and edge elements, there is a method of calculating the similarity between histograms.

The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. It is preferable that a small region concerning the small region feature quantity for the reference image supplied as input corresponds to a small region concerning the small region feature quantity for the inquiry image supplied from the small region feature quantity extraction means 112. This is because corresponding small regions can be directly compared with each other. Different image division methods may cause a discrepancy between the inquiry image's small region and the reference image's small region. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The image similarity calculation means 722 calculates the overall image's similarity from small region similarities supplied from the small region similarity calculation means 721. The image similarity calculation means 722 modifies the calculated overall image's similarity using the match determination threshold supplied from the match determination threshold calculation means 74. The image similarity calculation means 722 outputs the modified similarity as an image similarity. Methods of calculating the overall image's similarity include finding a total sum of small region similarities for all small regions or finding an average value thereof. There is a method of modifying the overall image's similarity using the match determination threshold. The method modifies the similarity to 1 when the image similarity is equal to or greater than the match determination threshold. The method modifies the similarity to 0 when the image similarity is smaller than the match determination threshold.

Similar to the fifth embodiment, the seventh embodiment calculates an image similarity suited for determining whether or not an edited inquiry image is generated from the reference image. In addition, the seventh embodiment calculates a match determination threshold based on the local region editing probability directly calculated from the inquiry image. The seventh embodiment calculates a match determination threshold for each inquiry image differently from the fifth embodiment that heuristically finds the match determination threshold as an average value from the learning image or the device characteristic Accordingly, the seventh embodiment can more accurately find the image similarity suited for determining whether or not an edited inquiry image is generated from the reference image. The seventh embodiment requires no learning image or device characteristic as input.

Eighth Embodiment

The eighth embodiment of the present invention will be described in further detail with reference to the accompanying drawings. As shown in a block diagram of FIG. 16, the eighth embodiment differs from the seventh embodiment as follows. The eighth embodiment of the image similarity calculation system according to the present invention replaces the image similarity calculation portion 72 shown in FIG. 15 according to the seventh embodiment with an image similarity calculation portion 82. The eighth embodiment provides the reference image group small region feature quantity storage portion 25 and the retrieval result output means 26. The reference image group small region feature quantity storage portion 25 and the retrieval result output means 26 are the same as those provided for the second embodiment.

The image similarity calculation portion 82 functionally includes a small region similarity calculation means 821 and an image similarity calculation means 822.

The small region similarity calculation means 821 reads small region feature quantities for multiple reference images from the reference image group small region feature quantity storage portion 25 on an image basis. The small region similarity calculation means 821 compares the read small region feature quantity for each of the reference images with the inquiry image's small region feature quantity input from the small region feature quantity extraction means 112. The small region similarity calculation means 821 calculates a small region similarity, i.e., a feature quantity similarity for each small region. The small region similarity calculation means 821 outputs the calculated small region similarity for each reference image in the reference image group to the image similarity calculation means 822. Any method of calculating the small region similarity can be settled according to the small region feature quantity to be used. For example, when the small region feature quantity to be used is a representative value such as an average value, a mode value, or a median value for the small region's color, there is a method of calculating the similarity based on a distance value and a correlation value in a color space being used. When the small region feature quantity to be used is an occurrence histogram for colors and edge elements, there is a method of calculating the similarity between histograms.

The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in international standard ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. Different image division methods may cause a discrepancy between a small region concerning the small region feature quantity for the inquiry image input from the small region feature quantity extraction means 112 and a small region concerning the small region feature quantity for the reference image read from the reference image group small region feature quantity storage portion 25. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The image similarity calculation means 822 calculates an overall image's similarity from small region similarities for the reference images in the reference image group supplied from the small region similarity calculation means 821. The image similarity calculation means 822 modifies the calculated overall image's similarity using the match determination threshold supplied from the match determination threshold calculation means 74. The image similarity calculation means 822 outputs an image similarity, i.e., a similarity of reference images in the reference image group, to the retrieval result output means 26. Methods of calculating the overall image's similarity include finding a total sum of small region similarities for all small regions or finding an average value thereof. There is a method of modifying the overall image's similarity using the match determination threshold. The method modifies the similarity to 1 when the image similarity is equal to or greater than the match determination threshold. The method modifies the similarity to 0 when the image similarity is smaller than the match determination threshold.

Similar to the second embodiment, the retrieval result output means 26 outputs a retrieval result.

The eighth embodiment retrieves images using the image similarity calculation method having the effect according to the seventh embodiment of the present invention. Differently from the sixth embodiment, the eighth embodiment calculates a match determination threshold for each inquiry image. Accordingly, the eighth embodiment can more accurately retrieve all original images for edited inquiry images from the reference image group. Similar to the seventh embodiment, the eighth embodiment requires no learning image or device characteristic as input.

Ninth Embodiment

The ninth embodiment of the present invention will be described in further detail with reference to the accompanying drawings. As shown in a block diagram of FIG. 17, the ninth embodiment of the image similarity calculation system according to the present invention is functionally composed of the feature quantity extraction portion 11, an image similarity calculation portion 92, an editing probability model estimation means 93, a local region weight calculation means 94, and a match determination threshold calculation means 95. The feature quantity extraction portion 11 is the same as that provided for the first embodiment. It may be preferable to configure the local region weight calculation means 94 and the match determination threshold calculation means 95 as single weight value and match determination threshold calculation means.

The editing probability model estimation means 93 calculates local region editing probability, i.e., probability of an editing process applied to each local region in an image from an edited learning image or characteristics of a device to perform the editing process supplied as input. The editing probability model estimation means 93 outputs the calculated local region editing probability to the local region weight calculation means 94.

Examples of the device characteristic include editing patterns applied to an image by the editing device and information about the frequency of using each editing patterns. It is preferable that the local region corresponds to a small region divided by the image division means 111. In addition, the local region may correspond to any of multiple smaller regions resulting from further dividing a small region divided by the image division means 111. Moreover, the local region may correspond to each element of the image. Furthermore, the local region may correspond to any of regions divided in any shapes and sizes different from those for the small region division method for the image division means 111.

When an edited learning image is input, the local region editing probability is measured by specifying regions that an editing process was applied in the learning image. Methods of specifying edited regions may include not only manual methods, but also methods of automatically detecting editing processes such as the ticker detection method. Characteristics of a device to perform editing processes may be supplied as input. In such case, there is available the method of measuring the local region editing probability based on editing patterns applied to an image by the device and based on information about the frequency of using each editing patterns.

The local region weight calculation means 94 calculates a local region weight value based on the local region editing probability supplied from the editing probability model estimation means 93. The local region weight value quantifies how effectively the feature quantity extracted from local regions of an image works for calculation of the similarity for the overall image. The local region weight calculation means 94 outputs the calculated local region weight value to the image similarity calculation means 922 and the match determination threshold calculation means 95. It is effective to set a larger local region weight value in proportion to a decrease in the local region editing probability attributed to the local region. There is an example of the method for calculating the local region weight value as follows.

Local region weight value=1−local region editing probability

The present invention is not limited thereto. During the image similarity calculation process, it may be preferable to use the other calculation methods capable of eliminating the effect of a highly possibly edited region.

Like the local region in the editing probability model estimation means 13, it is preferable that the local region corresponds to a small region divided by the image division means 111. In addition, the local region may correspond to any of multiple smaller regions resulting from further dividing a small region divided by the image division means 111. Furthermore, the local region may correspond to each element of the image. Still further, the local region may correspond to any of regions divided in any shapes and sizes different from those for the small region division method for the image division means 111.

The match determination threshold calculation means 95 is supplied with a local region weight value from the local region weight calculation means 94. Based on the local region weight value, the match determination threshold calculation means 95 calculates a match determination threshold for image similarities found by the image similarity calculation means 922 to be described later. The match determination threshold represents an optimum threshold value for determining whether or not two compared images match. The match determination threshold calculation means 95 outputs the calculated match determination threshold to the image similarity calculation means 922. The image similarity calculation means 922 weights the similarity for each small region using a small-region-based weight value found from the local region weight value. The image similarity calculation means 922 calculates the overall image's similarity by eliminating effects of the editing process. Accordingly, the match determination threshold calculation means 95 calculates the match determination threshold in consideration for the local region weight value. There is a method of calculating the optimum threshold value between an edited image and the original image as follows. The match determination threshold calculation means 95 calculates an estimated value of the overall image's similarity based on the local region weight value between an edited image and the original image by using it and eliminating effects of the editing process. Based on the estimated overall image's similarity, the method finds a threshold value that the probability of determining a mismatch (discrepancy) between the edited image and the original image is small enough. In addition, it may be preferable to provide for effects of feature quantity variations due to noise occurrence resulting from re-encoding the image.

The image similarity calculation portion 92 functionally includes a small region similarity calculation means 921 and an image similarity calculation means 922.

The small region similarity calculation means 921 compares the small region feature quantity of an inquiry image supplied from the small region feature quantity extraction means 112 with that of a reference image supplied as input. The small region similarity calculation means 921 calculates a small region similarity, i.e., a feature quantity similarity for each small region. The small region similarity calculation means 921 outputs the calculated small region similarity to the image similarity calculation means 922. Any method of calculating the small region similarity may be settled according to the small region feature quantity to be used. For example, when the small region feature quantity to be used is a representative value such as an average value, a mode value, or a median value for the small region's color, there is a method of calculating the similarity based on a distance value and a correlation value in a color space being used. When the small region feature quantity to be used is an occurrence histogram for colors and edge elements, there is a method of calculating the similarity between histograms.

The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. It is preferable that a small region concerning the small region feature quantity for the reference image supplied as input corresponds to a small region concerning the small region feature quantity for the inquiry image supplied from the small region feature quantity extraction means 112. This is because corresponding small regions can be directly compared with each other. Different image division methods may cause a discrepancy between the inquiry image's small region and the reference image's small region. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The small region similarity calculation means 921 inputs the small region similarity to the image similarity calculation means 922. The image similarity calculation means 922 weights this small region similarity using a weight value for each small region found from a local region weight value input from the local region weight calculation means 94. The image similarity calculation means 922 calculates an overall image's similarity from the resulting weighted small region similarities. The image similarity calculation means 922 modifies the calculated image similarity using the match determination threshold supplied from the match determination threshold calculation means 95 and outputs the modified image similarity as an image similarity. Methods of calculating the overall image's similarity include finding a total sum of weighted small region similarities for all small regions or finding an average value thereof.

If the local region of the local region weight value input from the local region weight calculation means 94 corresponds to a small region of the small region similarity input from the small region similarity calculation means 921, the local region weight value can be directly used as a weight value for each small region. When the small region of the small region similarity does not correspond to the local region of the local region weight value, it is a good practice to use the local region weight value to complement the weight value corresponding to the small region of the small region similarity. For example, a local region of the local region weight value may result from further dividing a small region having the small region similarity into multiple smaller regions. In this case, it is possible to generate a weight value corresponding to the small region of the small region similarity by calculating an average value for multiple local region weight values.

There may be a case where the local region division method concerning local region weight values uses shapes and sizes completely different from those for the small region division method concerning small region similarities. In this case, weight values of the multiple local regions which overlap with the small regions are then weighted in proportion to overlapping areas and are totaled. In this manner, it is possible to generate the weight value corresponding to the small region of the small region similarity. There is a method of modifying the overall image's similarity using the match determination threshold. The method modifies the similarity to 1 when the image similarity is equal to or greater than the match determination threshold. The method modifies the similarity to 0 when the image similarity is smaller than the match determination threshold.

The ninth embodiment has the effects of the first and fifth embodiments. The ninth embodiment can eliminate the effect of a highly possibly edited region to calculate the image similarity suited for determining whether or not an edited inquiry image is generated from the reference image. The ninth embodiment supplies a local region weight value calculated by the local region weight value calculation means 94 to the match determination threshold calculation means 95. According to this configuration, the match determination threshold calculation means 95 need not recalculate the local region weight value from the local region editing probability supplied from the editing probability model estimation means 93, wherein the local region weight value is referenced to calculate a match determination threshold. In this manner, the amount of calculation can be suppressed. Further, the ninth embodiment needs no process for detecting an edited region from the inquiry image and calculates a local region weight value and a match determination threshold from the learning image or the device characteristic. Accordingly, another process can be used to find the local region weight value and the match determination threshold in advance, making it possible to fast calculate the image similarity.

The modifications of the first embodiment can be also applied to the ninth embodiment. That is, the editing probability model storage means may be provided instead of the editing probability model estimation means 93. It may be preferable to provide the editing probability model update means and the editing probability model storage means.

Tenth Embodiment

The tenth embodiment of the present invention will be described in further detail with reference to the accompanying drawings. As shown in a block diagram of FIG. 18, the tenth embodiment differs from the ninth embodiment as follows. The tenth embodiment of the image similarity calculation system according to the present invention replaces the image similarity calculation portion 92 shown in FIG. 17 according to the ninth embodiment with an image similarity calculation portion 1020. The tenth embodiment includes the reference image group small region feature quantity storage portion 25 and the retrieval result output means 26. The reference image group small region feature quantity storage portion 25 and the retrieval result output means 26 are the same as those provided for the second embodiment.

The image similarity calculation portion 1020 functionally includes the small region similarity calculation means 1021 and the image similarity calculation means 1022.

The small region similarity calculation means 1021 reads small region feature quantities for multiple reference images from the reference image group small region feature quantity storage portion 25 on an image basis. The small region similarity calculation means 1021 compares the read small region feature quantity for each of the reference images with the inquiry image's small region feature quantity input from the small region feature quantity extraction means 112. The small region similarity calculation means 1021 calculates a small region similarity, i.e., a feature quantity similarity for each small region. The small region similarity calculation means 1021 outputs the calculated small region similarity for each reference image in the reference image group to the image similarity calculation means 1022. Any method of calculating the small region similarity can be settled according to the small region feature quantity to be used. For example, when the small region feature quantity to be used is a representative value such as an average value, a mode value, or a median value for the small region's color, there is a method of calculating the similarity based on a distance value and a correlation value in a color space being used. When the small region feature quantity to be used is an occurrence histogram for colors and edge elements, there is a method of calculating the similarity between histograms.

The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in international standard ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 for if the comparing edge elements do not match. Different image division methods may cause a discrepancy between a small region concerning the small region feature quantity for the inquiry image input from the small region feature quantity extraction means 112 and a small region concerning the small region feature quantity for the reference image read from the reference image group small region feature quantity storage portion 25. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with are then weighted in proportion to overlapping areas and are totaled. In this manner, it is possible to generate the feature quantity corresponding to the inquiry image's small region.

The image similarity calculation means 1022 is supplied with the small region similarity for each reference image in the reference image group from the small region similarity calculation means 1021. The image similarity calculation means 1022 weights the supplied small region similarity using a small-region-based weight value found from local region weight values supplied from the local region weight calculation means 94. The image similarity calculation means 1022 calculates an overall image's similarity from the resulting weighted small region similarities. The image similarity calculation means 1022 modifies the calculated overall image's similarity using the match determination threshold supplied from the match determination threshold calculation means 95. The image similarity calculation means 1022 outputs an image similarity, i.e., a similarity of reference images in the modified reference image group, to the retrieval result output means 26. Methods of calculating the overall image's similarity include finding a total sum of weighted small region similarities for all small regions and finding an average value thereof.

If the local region of the local region weight value input from the local region weight calculation means 94 corresponds to a small region of the small region similarity input from the small region similarity calculation means 1021, the local region weight value can be directly used as a weight value for each small region. When the small region having the small region similarity does not correspond to the local region having local region weight value, the local region weight value may be used to complement the weight value corresponding to the small region having the small region similarity. For example, the local region having the local region weight value may result from further dividing the small region having the small region similarity into multiple smaller regions. In this case, averaging multiple local region weight values can generate a weight value corresponding to the small region having the small region similarity.

There may be a case where the local region division method concerning local region weight values uses shapes and sizes completely different from those for the small region division method concerning small region similarities. In this case, weight values of the multiple local regions which overlap with the small regions are then weighted in proportion to overlapping areas and are totaled. In this manner, it is possible to generate the weight value corresponding to the small region of the small region similarity. There is a method of modifying the overall image's similarity using the match determination threshold. The method modifies the similarity to 1 when the image similarity is equal to or greater than the match determination threshold. The method modifies the similarity to 0 when the image similarity is smaller than the match determination threshold.

Similar to the second embodiment, the retrieval result output means 26 outputs a retrieval result.

The tenth embodiment retrieves images using the image similarity calculation method having the effect according to the ninth embodiment. Similar to the ninth embodiment, the tenth embodiment requires no process to detect an edited region from the inquiry image and makes it possible to previously find the local region weight value and the match determination threshold, thus enabling fast image retrieval.

The modifications of the first embodiment can be also applied to the tenth embodiment. That is, the editing probability model storage means may be provided instead of the editing probability model estimation means 93. It may be preferable to provide the editing probability model update means and the editing probability model storage means.

Eleventh Embodiment

The eleventh embodiment of the present invention will be described in further detail with reference to the accompanying drawings. As shown in a block diagram of FIG. 19, the eleventh embodiment of the image similarity calculation system according to the present invention is functionally composed of the feature quantity extraction portion 11, an image similarity calculation portion 1120, an editing region detection means 113, a local region weight calculation means 114, and a match determination threshold calculation means 115. The feature quantity extraction portion 11 is the same as that provided for the first embodiment.

The editing region detection means 113 uses a method of automatically detecting edited regions such as the ticker detection method for an edited inquiry image supplied as input. Using this method, the editing region detection means 113 calculates a local region editing probability, i.e., a probability that an editing process was applied to each local region in the inquiry image. The editing region detection means 113 outputs the calculated local region editing probability to the local region weight calculation means 114. The local region editing probability may have any probability value or a binary value 1 or 0. The local region may correspond to any of multiple smaller regions resulting from further dividing a small region divided by the image division means 111. Moreover, the local region may correspond to each element of the image. Furthermore, the local region may correspond to any of regions divided in any shapes and sizes different from those for the small region division method for the image division means 111.

The local region weight calculation means 114 calculates a local region weight value based on the local region editing probability supplied from the editing region detection means 113. The local region weight value quantifies how effectively the feature quantity extracted from local regions of an image works for calculation of the similarity for the overall image. The local region weight calculation means 114 outputs the calculated local region weight value to the image similarity calculation means 1122 and the match determination threshold calculation means 115.

It is preferable that the local region corresponds to a small region divided by the image division means 111. In addition, the local region may correspond to any of multiple smaller regions resulting from further dividing a small region divided by the image division means 111. Moreover, the local region may correspond to each element of the image. Furthermore, the local region may correspond to any of regions divided in any shapes and sizes different from those for the small region division method for the image division means 111. There is an example of the method for calculating the local region weight value as follows.

$$\text{Local region weight value 1-local region editing probability}$$

The present invention is not limited thereto. During the image similarity calculation process, it may be preferable to use the other calculation methods capable of eliminating the effect of a highly possibly edited region.

The editing region detection means 113 may supply local region editing probabilities as binary probability values such as 1 and 0. In this case, there is a method of integrating multiple local regions into a new local region. The method finds a local region weight value as a ratio of an area of the local region having the local region editing probability value of 0 before the integration included in the local region after the integration.

The match determination threshold calculation means 115 is supplied with a local region weight value from the local region weight calculation means 114. Based on the local region weight value, the match determination threshold calculation means 115 calculates a match determination threshold for image similarities found by the image similarity calculation means 1122 to be described later. The match determination threshold represents an optimum threshold value for determining whether or not two compared images match. The match determination threshold calculation means 115 outputs the calculated match determination threshold to the image similarity calculation means 1122. The image similarity calculation means 1122 weights the similarity for each small region using a small-region-based weight value found from the local region weight value. The image similarity calculation means 1122 calculates the overall image's similarity by eliminating effects of the editing process. Accordingly, the match determination threshold calculation means 115 calculates the match determination threshold in consideration for the local region weight value. There is a method of calculating the optimum threshold value between an edited image and the original image as follows. The match determination threshold calculation means 115 calculates an estimated value of the overall image's similarity based on the local region weight value between an edited image and the original image by using it and eliminating effects of the editing process. Based on the estimated overall image's similarity, the method finds a threshold value that the probability of determining a mismatch (discrepancy) between the edited image and the original image is small enough. In addition, it may be preferable to provide for effects of feature quantity variations due to noise occurrence resulting from re-encoding the image.

The image similarity calculation portion 1120 functionally includes the small region similarity calculation means 1121 and the image similarity calculation means 1122.

The small region similarity calculation means 1121 compares the small region feature quantity of an inquiry image supplied from the small region feature quantity extraction means 112 with that of a reference image supplied as input. The small region similarity calculation means 1121 calculates a small region similarity, i.e., a feature quantity similarity for each small region. The small region similarity calculation means 1121 outputs the calculated small region similarity to the image similarity calculation means 1122. Any method of calculating the small region similarity may be settled according to the small region feature quantity to be used. For example, when the small region feature quantity to be used is a representative value such as an average value, a mode value, or a median value for the small region's color, there is a method of calculating the similarity based on a distance value and a correlation value in a color space being used. When the small region feature quantity to be used is an occurrence histogram for colors and edge elements, there is a method of calculating the similarity between histograms.

The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. It is preferable that a small region concerning the small region feature quantity for the reference image supplied as input corresponds to a small region concerning the small region feature quantity for the inquiry image supplied from the small region feature quantity extraction means 112. This is because corresponding small regions can be directly compared with each other. Different image division methods may cause a discrepancy between the inquiry image's small region and the reference image's small region. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities.

There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The small region similarity calculation means 1121 inputs the small region similarity to the image similarity calculation means 1122. The image similarity calculation means 1122 weights this small region similarity using a weight value for each small region found from a local region weight value input from the local region weight calculation means 114. The image similarity calculation means 1122 calculates an overall image's similarity from the resulting weighted small region similarities. The image similarity calculation means 1122 modifies the calculated image similarity using the match determination threshold supplied from the match determination threshold calculation means 115 and outputs the modified similarity as an image similarity. Methods of calculating the image similarity include finding a total sum of weighted small region similarities for all small regions or finding an average value thereof.

If the local region of the local region weight value input from the local region weight calculation means 114 corresponds to a small region of the small region similarity input from the small region similarity calculation means 1121, the local region weight value can be directly used as a weight value for each small region. When the small region of the small region similarity does not correspond to the local region of the local region weight value, it is a good practice to use the local region weight value to complement the weight value corresponding to the small region of the small region similarity. For example, a local region of the local region weight value may result from further dividing a small region of the small region similarity into multiple smaller regions. In this case, it is possible to generate a weight value corresponding to the small region of the small region similarity by calculating an average value for multiple local region weight values.

There may be a case where the local region division method concerning local region weight values uses shapes and sizes completely different from those for the small region division method concerning small region similarities. In this case, weight values of the multiple local regions which overlap with the small regions are then weighted in proportion to overlapping areas and are totaled. In this manner, it is possible to generate the weight value corresponding to the small region of the small region similarity. There is a method of modifying the overall image's similarity using the match determination threshold. The method modifies the similarity to 1 when the image similarity is equal to or greater than the match determination threshold. The method modifies the similarity to 0 when the image similarity is smaller than the match determination threshold.

Similar to the ninth embodiment, the eleventh embodiment calculates an image similarity suited for determining whether or not an edited inquiry image is generated from the reference image by eliminating the effect of a highly possibly edited region. In addition, the eleventh embodiment calculates a local region weight value and a match determination threshold based on the local region editing probability directly calculated from the inquiry image. The eleventh embodiment calculates a local region weight value and a match determination threshold for each inquiry image differently from the ninth embodiment that heuristically finds the local region weight value and the match determination threshold as average values from the learning image or the device characteristic. Accordingly, the eleventh embodiment can more accurately find the image similarity suited for determining whether or not an edited inquiry image is generated from the reference image. The eleventh embodiment requires no learning image or device characteristic as input. Similar to the ninth embodiment, the eleventh embodiment supplies a local region weight value calculated by the local region weight value calculation means 114 to the match determination threshold calculation means 115. Accordingly, the match determination threshold calculation means 115 need not recalculate the local region weight value from the local region editing probability supplied from the editing probability model estimation means 113, wherein the local region weight value is referenced to calculate a match determination threshold. In this manner, the amount of calculation can be suppressed.

Twelfth Embodiment

The twelfth embodiment of the present invention will be described in further detail with reference to the accompanying drawings. As shown in a block diagram of FIG. 20, the twelfth embodiment differs from the eleventh embodiment as follows. The twelfth embodiment of the image similarity calculation system according to the present invention replaces the image similarity calculation portion 112 in FIG. 19 according to the eleventh embodiment with an image similarity calculation portion 1220. The twelfth embodiment provides the reference image group small region feature quantity storage portion 25 and the retrieval result output means 26. The reference image group small region feature quantity storage portion 25 is the same as that provided for the second embodiment.

The image similarity calculation portion 1220 functionally includes a small region similarity calculation means 1221 and an image similarity calculation means 1222.

The small region similarity calculation means 1221 reads small region feature quantities for multiple reference images from the reference image group small region feature quantity storage portion 25 on an image basis. The small region similarity calculation means 1221 compares the read small region feature quantity for each of the reference images with the inquiry image's small region feature quantity input from the small region feature quantity extraction means 112. The small region similarity calculation means 1221 calculates a small region similarity, i.e. a feature quantity similarity for each small region. The small region similarity calculation means 1221 outputs the calculated small region similarity for each reference image in the reference image group to the image similarity calculation means 1222. Any method of calculating the small region similarity can be settled according to the small region feature quantity to be used. For example, when the small region feature quantity to be used is a representative value such as an average value, a mode value, or a median value for the small region's color, there is a method of calculating the similarity based on a distance value and a correlation value in a color space being used. When the small region feature quantity to be used is an occurrence histogram for colors and edge elements, there is a method of calculating the similarity between histograms.

The small region feature quantity to be used may be Dominant Color, Color Layout, Scalable Color, Color Structure, Edge Histogram, Homogeneous Texture, Texture Browsing, Region Shape, Contour Shape, Shape 3D, Parametric Motion, or Motion Activity specified in international standard ISO/IEC 15938-3. In this case, similarities can be calculated in accordance with the distance (similarity) calculation method recommended by ISO/IEC 15938-3.

The similarity may be a binary determination result such as 1 or 0. When the edge element feature quantity is used as the small region feature quantity, for example, there is a method of setting the similarity to 1 if the comparing edge elements match or setting the similarity to 0 if the comparing edge elements do not match. Different image division methods may cause a discrepancy between a small region concerning the small region feature quantity for the inquiry image input from the small region feature quantity extraction means 112 and a small region concerning the small region feature quantity for the reference image read from the reference image group small region feature quantity storage portion 25. To solve this problem, it is a good practice to use either image's small region feature quantity to complement the feature quantity corresponding to the other image's small region and calculate a similarity. For example, a small region concerning the reference image's small region feature quantity may result from further dividing the small region concerning the inquiry image's small region feature quantity into smaller multiple regions. In this case, it is possible to generate a feature quantity corresponding to the inquiry image's small region by calculating an average value of the reference image's multiple small region feature quantities. There may be a case where the small region division method concerning the reference image's small region feature quantity uses shapes and sizes completely different from those for the small region division method concerning the inquiry image's small region feature quantity. In this case, small region feature quantities of the reference image's small regions which overlap with the inquiry image's small regions are then weighted in proportion to overlapping areas and are totaled. In this manner, it is possible to generate the feature quantity corresponding to the inquiry image's small region.

The image similarity calculation means 1222 is supplied with the small region similarity for each reference image in the reference image group from the small region similarity calculation means 1221. The image similarity calculation means 1222 weights the supplied small region similarity using a small-region-based weight value found from local region weight values supplied from the local region weight calculation means 114. The image similarity calculation means 1222 calculates an overall image's similarity from the resulting weighted small region similarities. The image similarity calculation means 1222 modifies the calculated overall image's similarity using the match determination threshold supplied from the match determination threshold calculation means 115. The image similarity calculation means 1222 outputs an image similarity, i.e., a similarity of reference images in the modified reference image group, to the retrieval result output means 26. Methods of calculating the overall image's similarity include finding a total sum of weighted small region similarities for all small regions or finding an average value thereof.

If the local region of local region weight value input from the local region weight calculation means 114 corresponds to a small region of the small region similarity input from the small region similarity calculation means 1221, the local region weight value can be directly used as a weight value for each small region. When the small region of the small region similarity does not correspond to the local region of local region weight value, the local region weight value may be used to complement the weight value corresponding to the small region of the small region similarity. For example, the local region of the local region weight value may result from further dividing the small region of the small region similarity into multiple smaller regions. In this case, averaging multiple local region weight values can generate a weight value corresponding to the small region of the small region similarity.

There may be a case where the local region division method concerning local region weight values uses shapes and sizes completely different from those for the small region division method concerning small region similarities. In this case, weight values of the multiple local regions which overlap with the small regions are then weighted in proportion to overlapping areas and are totaled. In this manner, it is possible to generate the weight value corresponding to the small region of the small region similarity. There is a method of modifying the overall image's similarity using the match determination threshold. The method modifies the similarity to 1 when the image similarity is equal to or greater than the match determination threshold. The method modifies the similarity to 0 when the image similarity is smaller than the match determination threshold.

Similar to the second embodiment, the retrieval result output means 26 outputs a retrieval result.

The twelfth embodiment retrieves images using the image similarity calculation method having the effect according to the eleventh embodiment. Different from the first embodiment, the twelfth embodiment calculates a local region weight value and a match determination threshold for each inquiry image. Accordingly, the twelfth embodiment can more accurately retrieve all original images for edited inquiry images from the reference image group. Similar to the eleventh embodiment, the twelfth embodiment requires no learning image or device characteristic as input.

INDUSTRIAL APPLICABILITY

The present invention is applicable to the use of an image similarity calculation system, an image similarity calculation method, an image similarity calculation program for calculating similarities of multiple images, an image retrieval system for retrieving an image similar to an inquiry image, and the like.

The invention claimed is:
1. An image similarity calculation system for calculating an image similarity between an inquiry image and a reference image, comprising one or more processors implementing the steps of:
an editing probability estimation unit configured to compute a value X corresponding to a probability for an editing process to be applied to an image for each local region, based on either a learning image or a device characteristic input to the editing probability estimation unit;
a local region weight calculation unit configured to calculate an image-region-based weight value based on the probability for the editing process output by the editing probability estimation unit;
a feature quantity extraction unit configured to extract a feature quantity for each divided small region of the inquiry image; and
an image similarity calculation unit configured to calculate the image similarity between the inquiry image and the reference image by comparing the feature quantity for each divided small region of the inquiry image with a feature quantity for each divided small region of the reference image, using the image-region-based weight value output by the local region weight calculation unit.

2. The image similarity calculation system according to claim 1, wherein the local region is a divided region so as to correspond to a small region in the inquiry image or the reference image.

3. The image similarity calculation system according to claim 1, wherein a small region in the inquiry image or the reference image is an equally sized rectangular region resulting from dividing an image.

4. The image similarity calculation system according to claim 1, wherein a small region in the inquiry image or the reference image is one of regions which are divided so as to be partially overlap with each other, and wherein each small region is weighted in proportion to overlapping areas by the local region weight calculation unit.

5. The image similarity calculation system according to claim 1, wherein a small region in the inquiry image or the reference image results from dividing only part of an image.

6. The image similarity calculation system according to claim 1, wherein the feature quantity is based on at least one of color information, edge information, texture information, shape information, and motion information.

7. The image similarity calculation system according to claim 1, wherein the feature quantity is at least one of an average value, a mode value, and a median value for color coordinates specified in color space systems such as RGB color space, HSV color space, YUV color space, YIQ color space, YCbCr color space, L*a*b* color space, and XYZ color space, and Dominant Color, Color Layout, Scalable Color, Color Structure, Edge Histogram, Homogeneous Texture, Texture Browsing, Contour Shape, and Shape 3D specified in international standard ISO/IEC15938-3.

8. The image similarity calculation system according to claim 1, wherein the editing process corresponds to at least one of superposing a ticker on an image, superposing a caption on an image, superposing a character on an image, superposing an object on an image, partially cutting an image, partially cropping an image, partially mosaicking an image, and partially blurring an image.

9. An image retrieval system to retrieve images using an image similarity calculated in the image similarity calculation system according to claim 1.

10. An image retrieval system to output an image similar to an inquiry image from a plurality of reference images based on a calculated image similarity using an image similarity calculation system according to claim 1.

11. An image similarity calculation method for calculating an image similarity between an inquiry image and a reference image, comprising one or more processors implementing the following steps:
   computing a value X corresponding to a probability for an editing process to be applied to an image for each local region, based on either a learning image or a device characteristic;
   calculating an image-region-based weight value based on the probability for the editing process computed by the computing step;
   extracting a feature quantity for each divided small region of the inquiry image; and
   calculating the image similarity between the inquiry image and the reference image by comparing the feature quantity for each divided small region of the inquiry image with a feature quantity for each divided small region of the reference image, using the image-region-based weight value output by the calculating step.

12. A non-transitory computer readable medium storing an image similarity calculation program for calculating an image similarity between an inquiry image and a reference image, the image similarity calculation program allowing a computer to perform a process of:
   computing a value X corresponding to a probability for an editing process to be applied to an image for each local region, based on either a learning image or a device characteristic;
   calculating an image-region-based weight value based on the probability for the editing process computed by the computing step;
   extracting a feature quantity for each divided small region of the inquiry image; and
   calculating the image similarity between the inquiry image and the reference image by comparing the feature quantity for each divided small region of the inquiry image with a feature quantity for each divided small region of the reference image, using the image-region-based weight value output by the calculating step.

13. The image similar calculation system according to claim 1, wherein the image-region-based weight value is set to be larger in proportion to a decrease in the value X.

14. The image similar calculation system according to claim 13, wherein the image-region-based weight value is computed by the equation 1−X.

* * * * *